(12) United States Patent
Krumm et al.

(10) Patent No.: US 6,532,301 B1
(45) Date of Patent: Mar. 11, 2003

(54) OBJECT RECOGNITION WITH OCCURRENCE HISTOGRAMS

(75) Inventors: John Krumm, Redmond, WA (US); Peng Chang, Pittsburgh, PA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/336,280

(22) Filed: Jun. 18, 1999

(51) Int. Cl.[7] .................................................. G06K 9/00

(52) U.S. Cl. ..................... 382/170; 382/165; 382/305

(58) Field of Search .......................... 382/164, 169–172, 382/218–220, 224, 181, 305, 162, 165, 103, 133–134, 168–173, 271; 707/1–6

(56) References Cited

U.S. PATENT DOCUMENTS

| | | | |
|---|---|---|---|
| 5,608,820 A | * | 3/1997 | Vaidyanathan .............. 382/169 |
| 5,671,290 A | * | 9/1997 | Vaidyanathan .............. 382/133 |

OTHER PUBLICATIONS

Peng Chang et al., Object Recognition with Color Histograms, Apr. 1999, IEEE, 0–7695–0149, 498–504.*
Valkealahti et al., Reduced Multidimensional Histogram in Color Texture Description, Aug. 1998, IEEE, 0–8186–8512–3, 1–5.*
D. P. Huttenlocher, G. A. Klanderman, and W. J. Ricklidge, "Comparing Images Using the Hausdorff Distance," IEEE Transactions on Pattern Analysis and Machine Intelligence, vol. 15, pp. 850–863, 1993.
Y. Lamdan and H. J. Wolfson, "Geometric Hashing: A General and Efficient Model–Based Recognition Scheme," presented at Second International Conference on Computer Vision, Tampa, Florida, 1988.
S. Sclaroff and J. Isidoro, "Active Blobs," presented at Sixth International Conference on Computer Vision Bombay, India, 1998.
M. Turk and A. Pentland, "Eigenfaces for Recognition," Journal of Cognitive Neuroscience, vol. 3, pp. 71–86, 1991.
H. Murase and S. K. Nayar, "Visual Learning and Recognition of 3–D Objects from Appearance," International Journal of Computer Vision, vol. 14, pp. 5–24, 1995.

(List continued on next page.)

*Primary Examiner*—Phuoc Tran
*Assistant Examiner*—Ishrat Sherali
(74) *Attorney, Agent, or Firm*—Lyon & Harr, LLP; Richard T. Lyon

(57) ABSTRACT

This invention is directed toward an object recognition system and process that identifies the location of a modeled object in a search image. This involves first capturing model images of the object whose location is to be identified in the search image. A co-occurrence histogram (CH) is then computed for each model images. A model image CH is computed by generating counts of every pair of pixels whose pixels exhibit colors that fall within the same combination of a series of pixel color ranges and which are separated by a distance falling within the same one of a series of distance ranges. Next, a series of search windows, of a prescribed size, are generated from overlapping portions of the search image. A CH is also computed for each of these search windows using the pixel color and distance ranges established for the model image CHs. A comparison between each model image CH and each search window CH is conducted to assess their similarity. A search window that is associated with a search window CH having a degree of similarity to one of the model image CHs which exceeds a prescribed search threshold is designated as potentially containing the object being sought. This designation can be presumed final, or further refined. This system and process requires that the size of the search window, color ranges and distance ranges be chosen ahead of time. The choice of these parameters can be optimized via a false alarm analysis.

73 Claims, 8 Drawing Sheets

(1 of 8 Drawing Sheet(s) Filed in Color)

OTHER PUBLICATIONS

M. J. Swain and D. H. Ballard, "Color Indexing," International Journal of Computer Vision, vol. 7, pp. 11–32, 1991.

B. V. Funt and G. D. Finlayson, "Color Constant Color Indexing," IEEE Transactions on Pattern Analysis and Machine Intelligence, vol. 17, pp. 522–529, 1995.

D. Forsyth, J. L. Mundy, A. Zisserman, C. Coelho, A. Heller, and C. Rothwell, "Invariant Descriptors for 3–D Object Recognition and Pose," IEEE Transactions on Pattern Analysis and Machine Intelligence, vol. 13, pp. 971–991, 1991.

J. Huang, S. R. Kumar, M. Mitra, W.–J. Zhu, and R. Zabih, "Image Indexing Using Color Correlograms," presented at IEEE Conference on Computer Vision and Pattern Recognition, San Juan, Puerto Rico, 1997.

G. Pass and R. Zabih, "Histogram Refinement for Content–Based Image Retrieval," presented at IEEE Workshop on Applications of Computer Vision, Sarasota, Florida, 1996.

R. M. Haralick, K. Shanmugam, and I. Dinstein, "Textural Features for Image Classification," IEEE Transactions on Systems, Man, and Cybernetics, vol. SMC–3, pp. 610–621, 1973.

O. Kempthorne and L. Folks, in Probability, Statistics, and Data Analysis. Ames, Iowa: Iowa State University Press, 1971, pp. 108–121.

* cited by examiner

   
FIG. 8(a)   FIG. 8(b)   FIG. 8(c)   FIG. 8(d)
   
FIG. 8(e)   FIG. 8(f)   FIG. 8(g)   FIG. 8(h)
   
FIG. 8(i)   FIG. 8(j)   FIG. 8(k)   FIG. 8(l)
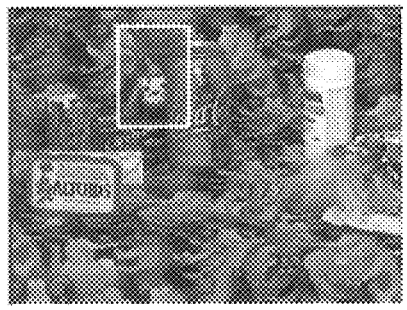
FIG. 11
FIG. 12

OBJECT RECOGNITION WITH OCCURRENCE HISTOGRAMS

BACKGROUND

1. Technical Field

The invention is related to a computer-implemented object recognition system and process, and more particularly, to such a system and process employing co-occurrence histograms (CH) for finding an object in a search image.

2. Background Art

Object recognition in images is typically based on a model of the object at some level of abstraction. This model is matched to an input image which has been abstracted to the same level as the model. At the lowest level of abstraction (no abstraction at all), an object can be modeled as a whole image and compared, pixel by pixel, against a raw input image. However, more often unimportant details are abstracted away, such as by using sub-templates (ignoring background and image position), normalized correlation (ignoring illumination brightness), or edge features (ignoring low spatial frequencies). The abstraction itself is embodied in both the representation of the object and in the way it is matched to the abstracted image. For instance, Huttenlocher et al. [1] represent objects as simple edge points and then match with the Hausdorff distance. While the edge points form a completely rigid representation, the matching allows the points to move nonrigidly.

One interesting dimension of the aforementioned abstraction is rigidity. Near one end of this dimension are the several object recognition algorithms that abstract objects into a rigid or semi-rigid geometric juxtaposition of image features. These include Hausdorff distance [1], geometric hashing [2], active blobs [3], and eigenimages [4, 5]. In contrast, some histogram-based approaches abstract away (nearly) all geometric relationships between pixels. In pure histogram matching, e.g. Swain & Ballard [6], there is no preservation of geometry, just an accounting of the number of pixels of given colors. The technique of Funt & Finlayson [7] uses a histogram of the ratios of neighboring pixels, which introduces a slight amount of geometry into the representation.

Abstracting away rigidity is attractive, because it allows the algorithm to work on non-rigid objects and because it reduces the number of model images necessary to account for appearance changes due to scaling and viewpoint change. One can start with a geometrically rigid approach and abstract away some rigidity by using geometric invariants [8], loosening the matching criteria [1], or explicitly introducing flexibility into the model [3]. On the other hand, one can start with a method like Swain & Ballard's color indexing [6], which ignores all geometry, and add some geometric constraints. For example, some histogram-based approaches, most of which are used to find images in a database rather than to find an object in an image, have employed attempts to add spatial information to a regular color histogram. Included among these are Huang et al. [9] where a "color correlogram" is used to search a database for similar images, or Pass and Zabih [10] where "color coherence vectors" are employed that represent which image colors are part of relatively large regions of similar color.

The dilemma comes in deciding how much to abstract away. The goal is to ignore just enough details of the object's appearance to match all anticipated images of the object, but not so many details that the algorithm generates false matches. The present invention addresses this issue.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [4, 5]. A listing of the publications corresponding to each designator can be found at the end of the Detailed Description section.

SUMMARY

This invention is directed toward an object recognition system and process that identifies the location of a modeled object in an image. Essentially, this involves first creating model images of the object whose location is to be identified in the search image. As the object may be depicted in the search image in any orientation, it is preferred that a number of model images be captured, of which each shows the object from a different viewpoint. Ideally, these model images would be taken from viewpoints spaced at roughly equal angles from each other around the object. In addition, multiple images could be taken at each angular viewpoint where each is captured at a different distance away from the object being modeled. This latter method would better model an object whose distance from the camera capturing the search image is unknown. One way of determining how far apart each angular viewpoint should be to ensure a good degree of match between the object in the search image and one of the model images is to require a high degree of matching between each model image. Similarly, it is desirable that a good degree of match exist between adjacent model images taken at the same angular viewpoint, but at different distances from the object, for the same reasons.

Each model image is processed to compute a color co-occurrence histogram (CH). This unique histogram keeps track of the number of pairs of certain "colored" pixels that occur at particular separation distances in the model image. In this way, geometric information is added to the histogram to make it more selective of the object in the search image, than would a simple color histogram. In generating the CH there are two parameters that are selected ahead of time. These parameters are the color ranges and the distance ranges. Choosing the color ranges involves dividing the total possible color values associated with the pixels of the model images into a series of preferably equal sized color ranges. Choosing the distance ranges involves selecting a set of distance ranges, for example (1–2 pixels), (2–3 pixels), (3–4 pixels) . . . , up to a prescribed maximum separation distance between pairs of pixels that will be checked. The size of each color and distance range (& so ultimately the total number of different ranges) is preferably selected to optimize the search process as will be discussed later. Essentially, these ranges should be made small enough to ensure a high selectivity in finding the object in the search image and to minimize false matches. On the other hand, the ranges should be large enough to reduce the amount of processing and to allow enough flexibility in the match that small changes in the shape of the object in the search image (e.g. due to flexure, a slight change in viewpoint, or a different zoom level or scale) do not prevent an object from being recognized.

Once the color and distance ranges are established, each pixel in the model image is quantized in regards to its color by associating it to the color range which includes the actual color value of the pixel. The model images are quantized in regards to distance by associating each possible unique, non-ordered, pair of pixels in a model image to one of the distance ranges based on the actual distance separating the pixel pair. The CH is then generated by establishing a count of the number of pixel pairs in a model image which exhibit the same "mix" of color ranges and the same distance range.

The search image (i.e., the image to be searched for the modeled object) is first cordoned into a series of preferably equal sized sub-images or search windows. These search windows preferably overlap both side-to-side and up-and-down. In the tested embodiment of the present invention, the overlap was set to one-half the width and height of the search window. The size of the search window is preferably as large as possible so as to minimize the search process. However, it is also desired that the search window not be so large that false matches or alarms occur. It should be noted that the size of the search window, as well as the size of the aforementioned color and distance ranges, can be optimized via a unique false alarm analysis. This analysis will be discussed in greater detail below.

A CH is calculated for each search window in the same manner that they were generated in connection with the model images. In particular, the same color & distance ranges are employed in the quantization steps of the process. Each of these search window CHs is compared to each of the model image CHs. Essentially, this comparison assesses the similarity between the histograms. The results of this comparison can be handled in two ways. In a first version, a similarity value threshold is established and any comparison that exceeds the threshold would cause the associated search window to be declared as potentially containing the object. This version would allow identifying each location of the object in a search image which depicts more than one of the objects. In a second version, the threshold would still be used, but only the greatest of the similarity values exceeding the threshold would be chosen to indicate a search window potentially contains the object. This version would be especially useful where it is known only one of the objects exists in the image. It could also be useful in that the threshold could be made lower and the object still located, for example in a noisy image.

It is noted the preferred approach for assessing similarity between a search window CH and a model image CH is via an intersection analysis. In the context of the CHs, an intersection analysis essentially entails comparing the count in each corresponding color mix/distance category between a search window CH and a model image CH, and then identifying the smaller count. The identified smaller counts from each color mix/distance category are added together to produce a similarity value. It is noted that two matching images of an object will have a larger similarity value than non-matching images because the smallest count from each category will be nearly as large as the larger count, whereas the smaller count in non-matching images are likely to be significantly smaller than the larger value. Thus, the sum of the smaller counts from matching images should be larger than the sum of counts from nonmatching images.

Once the search window (or windows) potentially containing the object has been identified, the location can be fined tuned. This is accomplished by repeating the comparison process using the particular model image CH involved in the match and search window CHs generated from search windows respectively created by moving the identified search window up by one pixel row, down by one pixel row, to the left by one pixel column, and to the right by one pixel column, respectively. The search window associated with the largest similarity value of the five search windows (i.e., the original, up, down, right, & left) is selected. This refinement process is repeated until a newly selected window is associated with the maximum similarity value, unless the original search window already exhibits the maximum similarity value. This search window selected at the end of the refinement process is declared as containing the object.

The foregoing object recognition process employing color co-occurence histograms required that some of the search parameters be chosen ahead of time. Specifically, the size of the search window, color ranges and distance ranges must be selected. With enough trial-and-error experimentation, it is possible to discover reasonable values for these parameters. Such experimentation is not preferred because it can be tedious, and gives only a vague sense of the sensitivity of the search process to changes in these parameters. However, the choice of the parameters can be optimized via the unique false alarm analysis of the present invention.

The analysis employs a numerical algorithm that approximates a mathematical model for estimating the false alarm probability of the object recognition process. In the context of the CH object recognition system, the false alarm probability is the probability that the intersection of a search window CH and a model image CH ($I_{pm}$) will exceed the search threshold ($\alpha I_{mm}$) when the object is not actually in the search window. Intuitively, the false alarm rate would be expected to increase as the search window grows in size, because there will be more opportunities for accidentally accounting for all the entries in the model CH. Also, the false alarm probability would be expected to decrease with an increase in the number of colors ($n_c$) and the number of distances ($n_d$), because these increases lead to more specific models that are less likely to be accidentally accounted for by a random background. Pulling these parameters in the opposite direction is the desire for a speedy algorithm and for one that does not required too many model viewpoints of each object. The algorithm would run faster if the search window were larger, because the whole image could then be searched faster. The intersection computation would be faster with fewer colors and distances. Fewer distances would also tend to generalize a model of a particular viewpoint to match those of more disparate viewpoints, and it would match better with objects that flex. The false alarm probability helps arbitrate between these desires, making it possible to set the parameters for the fastest possible execution and most tolerant matching without undue risk of false alarm.

The process of computing the false alarm probability begins by computing the probability of occurrence of a given CH on a random background region. To this end, the number $n_k$ of ways that a distance interval can occur in the search window must be ascertained. For instance, a distance interval of 5 pixels can only occur in a limited number of ways in a given size image. This number can be computed using a simple Matlab program. For a fixed distance interval there are $n_c(n_c+1)/2$ possible unique, nonordered color pairs with corresponding bins in the CH, each pair occurring with probability $p_{ij}$. Each bin contains $n_{ij}^k$ counts. The probability of a partition of the $n_k$ color pairs into $n_c(n_c+1)/2$ bins with $n_{ij}^k$ in each bin is given by the multinomial distribution:

$$f(n_{11}^k, n_{12}^k, \ldots, n_{ij}^k, \ldots, n_{nc,nc}^k) = \binom{n_k}{n_{11}^k, n_{12}^k, \ldots, n_{ij}^k, \ldots, n_{nc,nc}^k} * p_{11}^{n_{11}^k} p_{12}^{n_{12}^k} \ldots p_{ij}^{n_{ij}^k} \ldots p_{ncnc}^{n_{nc,nc}^k}$$

where $$\begin{pmatrix} n_k \\ n_{11}^k, n_{12}^k, \ldots, n_{ij}^k, \ldots, n_{n_c,n_c}^k \end{pmatrix} = \frac{n_k!}{n_{11}^k! n_{12}^k! \ldots n_{ij}^k! \ldots n_{n_c,n_c}^k!}$$

The function $f(n_{11}^k, n_{12}^k, \ldots, n_{ij}^k, \ldots, n_{n_c,n_c}^k)$ will be abbreviated as $f(n_c, n_k)$ for convenience. This function $f(n_c, n_k)$ is the probability of observing a given set of co-occurrences in a distance range (k−1,k). As it is assumed (albeit not totally true) that these probabilities are independent with respect to k, the probability of seeing a particular CH in the search window would be $$P(CH) = \prod_{k=1}^{n_d} f(n_c, n_k)$$

If the intersection of the model CH and the image region CH exceeds a prescribed threshold without the object being there, then this is a false alarm. Ideally, to compute the probability of a false alarm, a list of all the CHs whose intersection with the model CH exceeds the threshold would be made. The probability of each CH in the list is computed as described above and summed to get the false alarm probability. However, the list is much too long. Instead the aforementioned multinomial distribution is approximated as a multivariate Gaussian distribution and integrated. This simplifies the problem from summing values in an enormous list to integrating a multidimensional Gaussian. Specifically, $f(n_c, n_k)$ can be approximated by the ordinate of a multidimensional Gaussian:

$$f(n_c, n_k) \approx g_k(n) = \frac{1}{(2\pi)^{m/2} |\Sigma|^{1/2}} \exp\left[-\frac{1}{2}(n-\mu)^T \Sigma^{-1}(n-\mu)\right]$$

where $M = n_c(n_c+1)/2 - 1$
$n = (n_{11}^k, n_{12}^k, \ldots, n_{ij}^k, \ldots, n_{n_c-1,n_c}^k)^T \; i \leq j$
$\mu = n_k(p_{11}, p_{12}, \ldots, p_{ij}, \ldots, p_{n_c-1,n_c})^T \; i \leq j$ and where the inverse covariance is $$\Sigma^{-1} = \{a_{rs}\} = \begin{cases} \frac{1}{n_k}\left(\frac{1}{q_r} + \frac{1}{q^*}\right) & \text{if } r = s \\ \frac{1}{n_k q^*} & \text{if } r \neq s \end{cases} \quad (r, s) \in [1, 2, \ldots, m]$$

The Gaussian $g_k(n)$ can be integrated to give probabilities of sets of CHs occurring in the image background. The integration limits are given in terms of the number of co-occurrences of particular color pairs. However, the Guassian only applies to a single specified distance range (k−1,k). Thus, it is still necessary to list all the CHs that could cause a false alarm. These would ideally be represented in terms of integration limits for the Guassian approximation, but this list is too complex to characterize in this way. However, by simplifying the definition of a false alarm from "any background CH whose intersection with the model exceeds the threshold $T = \alpha I_{mm}$" to "any background CH, each of whose entries $n_{ij}^k$ exceeds a threshold $T_{ij}^k = \alpha m_{ij}^k$", integrating the Gaussian gives the probability of false alarm for all color pairs at one distance range (k−1,k). Since it can be is presumed from P(CH)

$$P(CH) = \prod_{k=1}^{n_d} f(n_c, n_k)$$

$f(n_c, n_k)$ that the co-occurrences at different distances are independent, the probability of a false alarm can be approximated as $$P(\text{false alarm}) \approx \prod_{k=1}^{n_d} \int_{\Omega_k} g_k(n)$$

$\int_{\Omega_k} g_k(n)$ where $\Omega_k$ is the integration region for CH distance range (k−1,k). The integration region $\Omega_k$ is unbounded above and bounded below as $n_{11}^k \geq \alpha m_{11}^k, n_{12}^k \geq \alpha m_{12}^k, \ldots, n_{ij}^k \geq \alpha n_{ij}^k, \ldots, n_{n_c-1,n_c}^k \geq \alpha m_{n_c-1,n_c}^k$. The actual integration is preferably performed using a Monte Carlo technique.

The foregoing approximation of the probability of a false alarm occurring can then be used to plot probability curves for one of the parameters (i.e., either the colors ranges, the distance ranges, or the search window size) at different values thereof, while holding the other parameters constant. The goal of this procedure is to find the optimum value. In the case of the color and distance ranges this optimum will occur at a point where the ranges are as large as possible while at the same time exhibiting an acceptable probability of false alarms. In the case of the search window size, the optimum is the largest window size possible with the same acceptable probability of false alarms. It is noted that the plotting process can be repeated for various combinations of constant parameter values to find the curve that gives the largest color or distance range, or the largest window size, at an acceptably low false alarm probability. Preferably, the new values of the constant parameters would be chosen by performing an identical probability analysis using one of the constant parameters as the varying parameter and holding the others constant. Once initial values for each parameter have been computed the process is repeated iteratively until a set of mutually optimal values is established. It is also noted that the results are specific to the particular model image employed in the calculation, and so could be repeated for each model image. However, it was found in a tested embodiment that the computed optimal parameter values from one model image worked reasonably well for all the other models as well.

In view of the foregoing description, it is evident that the color CH is an effective way to represent objects for recognition in images. By keeping track of pairs of pixels, it allows a variable amount of geometry to be added to the regular color histogram. This in turn allows the object recognition process to work in spite of confusing background clutter and moderate amounts of occlusion and object flexing. Specifically, by adjusting the distances over which the co-occurrences are checked, the sensitivity of the process can be adjusted to account for geometric changes in the object's appearance such as caused by viewpoint change or object flexing. The CH is also robust to partial occlusions, because it is not required that the image account for all the co-occurrences of the model.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 8(a) through 8(l) are images depicting various model images of a figurine.

FIGS. 11 and 12 are images showing the results of employing the object recognition process according to the present invention and the model images shown in FIGS. 8(a) through 8(l). FIG. 11 shows that the location of the figurine was found in spite of background clutter and partial occlusion. FIG. 12 shows that the location of the figurine was found in spite of being flexed such that it was in a standing position with one arm outstretch instead of sitting with arms at the side as in the model images.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
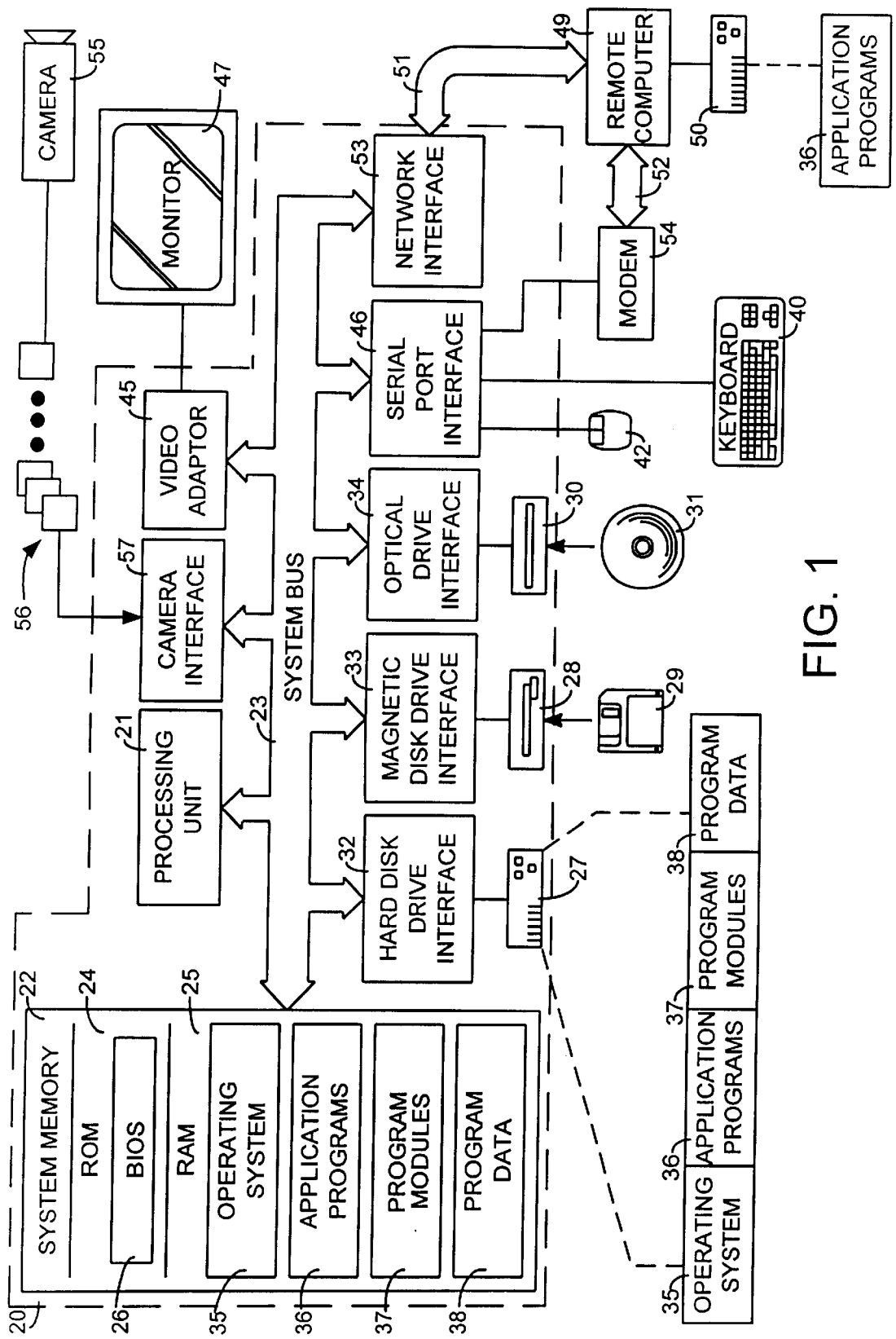
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to-a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying an object recognition process that identifies the location of a modeled object in an image according to the present invention.

1.0 The Object Recognition Process

Figure 2:
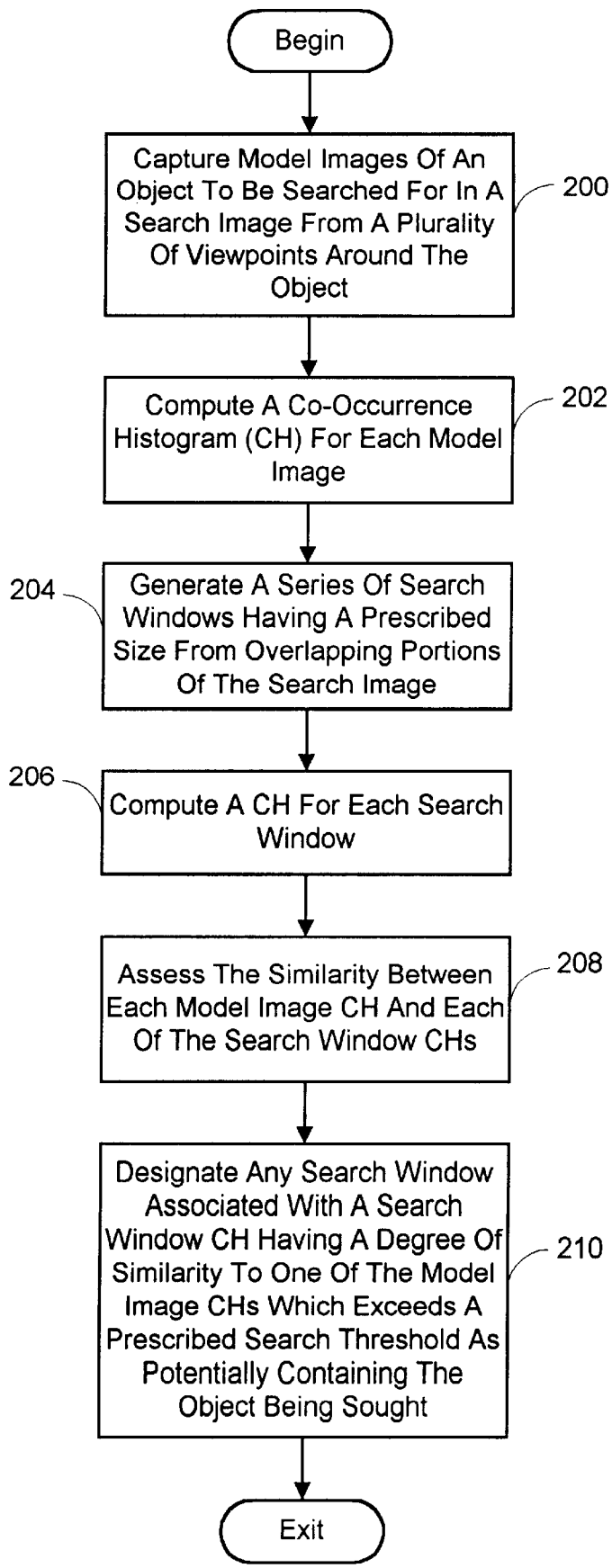
FIG. 2 is a block diagram of an overall object recognition process for identifying the location of a modeled object in a search image according to the present invention.

The general process will be explained first. Then, each step in the process will be discussed in detail in the sections that follow. Referring to FIG. 2, the first step 200 in the general object recognition process involves capturing model images of the object that will be searched for in an image (hereinafter referred to as the search image). These model images are captured from a plurality of "viewpoints" around the object. For the purposes of the present description, the term "viewpoint" refers to a viewing direction toward the object, rather than a specific point in space. Next, in step 202, a co-occurrence histogram (CH) is computed for each of the model images. Then, in step 204, a series of search windows, of a prescribed size, are generated from overlapping portions of the search image. A co-occurrence histogram is computed for each of the search windows in step 206. A comparison between the CH of each of the model images and the CH of each of the search windows is then conducted to assess the similarity between each pair of CHs (step 208). Finally, in step 210, any search window that is associated with a search window CH having a degree of similarity to one of the model image CHs which exceeds a prescribed search threshold is designated as potentially containing the object being sought. This designation can be presumed final, or refined as will be discussed later.

1.1 Creating Model Images;

As described above, the object recognition process first involves creating model images of the object whose location is to be identified in the search image. As the object may be depicted in the search image in any orientation, it is preferred that a number of model images be captured, of which each shows the object from a different viewpoint. Ideally, these model images would be taken from viewpoints spaced at equal angles from each other around the object.

The angle separating each model image viewpoint should be selected so that a high degree of matching (e.g., by exceeding the aforementioned search threshold) exists between one of the model images and a portion of the search image actually containing the modeled object. On the other hand, the aforementioned comparison process becomes more onerous as the number of model images increases. Therefore, it is preferred that the angle be large enough to minimize the number of model images required, while still providing the desired degree of match. One way of determining this optimal separation angle is to require a good degree of matching between each adjacent model image viewpoint, as measured by an appropriate threshold. Specifically, this can be accomplished by selecting a series of candidate separation angles, and for each candidate, assessing the degree of similarity between at least one pair of model images having adjacent viewpoints separated by the candidate separation angle. The largest candidate separation angle that has an assessed degree of similarity exceeding a prescribed model image separation angle threshold is designated as the separation angle to be employed in capturing the model images of the object. The aforementioned model image separation angle threshold is chosen so that the number of model images required is minimized, while still ensuring the model images cover every possible orientation of the sought after object in the search image.

Another aspect of the model image creation process is the distance away from the object that the images are captured. If it is generally known how far away from the camera the object is in the search image, then the model images could be captured at approximately the same distance away from the object being modeled. However, if this distance in not known, then it would be desirable to capture more than one model image at each viewpoint angle, where each image is captured at a different distance away from the object. In this way, the model images are more likely to accurately model the object of interest in the search image. It should be noted that the aforementioned similarity test used to ensure a good degree of matching between model images taken at adjacent angular viewpoints could also be employed to ensure a good degree of matching between model images taken at the same angular viewpoint, but at different distances away from the object. Specifically, this can be accomplished by selecting a series of candidate separation distances, and for each candidate, assessing the degree of similarity between at least one pair of adjacent model images separated by the candidate separation distance. The largest candidate separation distance that has an assessed degree of similarity exceeding a prescribed model image separation distance threshold is designated at the aforementioned separation distance to be employed in capturing the model images of the object. Similar to the aforementioned angle threshold, the model image separation distance threshold is chosen so that the number of model images required is minimize, while still ensuring the model images cover every possible distance away for the sought after object that might be encountered in the search image. In this way, it is more likely that one of the model images associated with a particular angular viewpoint will match (i.e., exceed the aforementioned search threshold) an object in the search image having a similar angular viewpoint.

1.2 Computing Co-occurrence Histograms (CHs) For Each Model Image.

As discussed in the description of the general object recognition process, a co-occurrence histogram (CH) is computed for each model image. It is noted that for the following description pixel "color" will be employed as the basis for computing the CH. The pixel "color" can be defined using any conventional characterization of the color space. Thus, each model image will be represented as a color CH. However, it is not intended that the present invention be limited to CHs based only on pixel color. Rather, it is envisioned that various other pixel characterizations could also be employed. For example, pixel gray levels could be used for gray scale images, or pixel depth values might be used.

Figure 3:
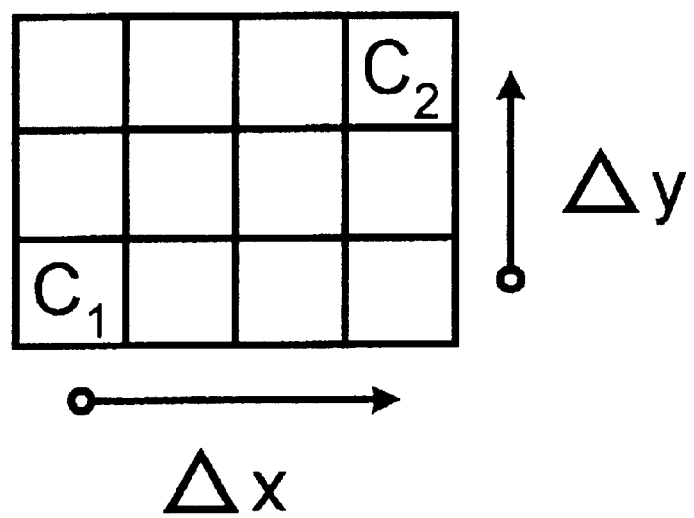
FIG. 3 is a diagram graphically depicting two pixels separated by a vector in an image plane.

Essentially, a color CH is a count of the number of occurrences of pairs of color pixels $c_1=(R_1,G_1,B_1)$ and $c_2=(R_2,G_2,B_2)$ separated by a vector in the image plane $(\Delta x,\Delta y)$, as depicted in FIG. 3. It is noted that for $(\Delta x,\Delta y)=(0,0)$, the color CH reduces to a regular color histogram (where $c_1=c_2$). For convenience of notation, the color co-occurrence histogram will be written symbolically as $CH(c_1,c_2,\Delta x,\Delta y)$.

In order to make the CHs invariant to rotation in the image plane, the direction of $(\Delta x,\Delta y)$ is ignored and only the magnitude $d=\sqrt{(\Delta x)^2+(\Delta y)^2}$ is tracked. In addition, the pixel colors are quantized into a set of $n_c$ representative colors $C=\{c_1,c_2,\ldots,c_{n_c}\}$, and the distances are quantized into a set of $n_d$ distance ranges $D=\{(0,1),(1,2),\ldots,(n_d-1,n_d)\}$. As to the quantization of the pixel colors, in general the process involves separately determining the colors of each model image. This is preferably accomplished using a standard nearest neighbor k-means algorithm, where the number of means is $n_c$, and where the Euclidian distance in (R,G,B) is employed. The whole gamut of determined colors is then divided into a set of color ranges to produce a series of quantized colors. Each pixel is then assigned to a quantized color by mapping its actual color from the gamut to its most similar (nearest) quantized color in the set $C=\{c_1,c_2,\ldots,c_{n_c}\}$. As for the distance ranges, it is noted that they can be of equal size as indicated above, or can also be adjusted in size so that each range is smaller or larger, as desired, depending on what works best for the application. The quantization in color and distance means the CH is represented by $CH(i,j,k)$, where i and j index the two colors from set C, and k indexes the distance range from set D. The question of how to choose the number of color ranges and distance ranges will be discussed in connection with a false alarm rate analysis later in this description.

Figure 4:
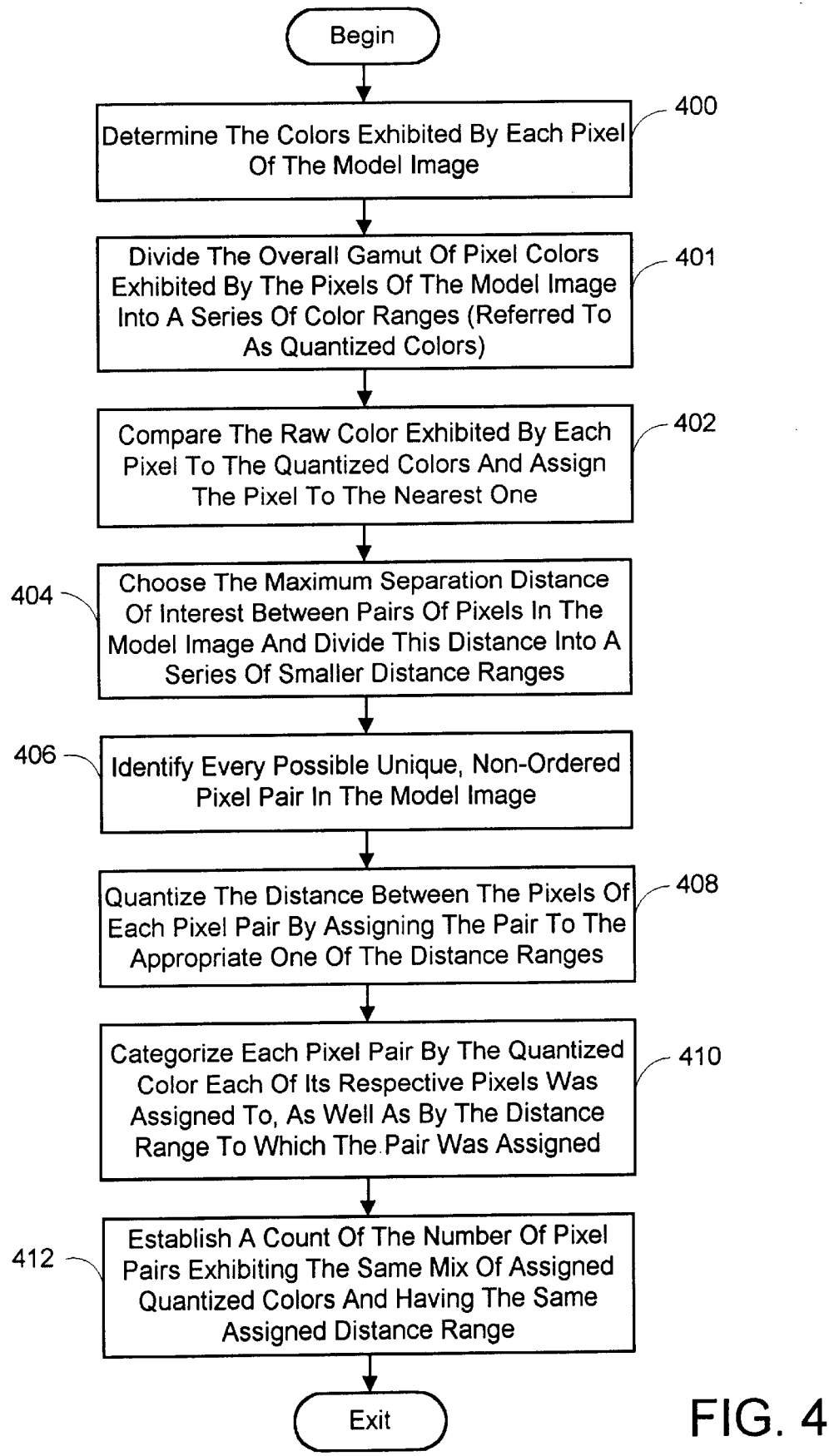
FIG. 4 is a block diagram of a process for accomplishing the model image co-occurrence histogram creation module of the overall process of FIG. 3.

In practice, a model image CH is computed via the steps illustrated in FIG. 4. In the first step 400, the colors exhibited by the pixels of the model image are determined, as indicated above. The overall gamut of possible pixel "colors" exhibited by the pixels is then divided into a series of discrete color ranges (step 401). Preferably these color ranges are equal in size, although they need not be made so. The model image is quantized into the $n_c$ colors. This is done as shown in step 402 by comparing the raw color exhibited by a pixel to the set of quantized colors and assigning the pixel to the nearest quantized color.

The distance ranges are also established, either at this point, or more preferably, prior to beginning the process. This involves choosing a maximum distance of interest and dividing it into a series of distance ranges (step 404). For instance, in a tested embodiment a maximum distance range of 12 pixels was chosen and divided into equal sized distance ranges each being one pixel wide (i.e., (1–2 pixels), (2–3 pixels), (3–4 pixels) . . . , (11–12 pixels)). Every possible unique, non-ordered pixel pair is then identified in step 406. For each of the identified pixel pairs, the next step 408 is to quantize the distance between the pixels making up the pair by assigning the pair to the appropriate one of the previously selected distance ranges.

Now that each pixel pair has been quanitzed as to the colors of the pixel making it up and the distance separating the pixels, the next step 410 in the process is to categorize each pixel pair by the assigned color range of each constituent pixel, as well as its assigned distance range. A count is then established for the number of pixel pairs exhibiting the same mix of assigned quantized colors and having the same assigned distance range (step 412).

1.3 Generating Search Windows and Search Window CHs.

In searching an image for an object, the image is scanned for a window that gives a CH similar to one of the model CHs. This is repeated for each of the model images. The image windows from which the model and image CHs are computed need not be the same size. In fact it is desirable to make the image search window as large as reasonably possible to increase the speed of scanning the whole image. However, the search window size should not be made so large that a substantial risk of a false match or alarm is introduced, Thus, it is desirable to choose a search window size which is as large as possible, while at the same time not being so large as to risk false alarms. The issue of choosing such a search window size is also addressed later using the aforementioned false alarm analysis.

The search windows are preferably generated by cordoning off the search image into a series of equally-sized regions having the chosen search window size and shape configuration. These regions preferably overlap both side-to-side and up-and-down, where possible (i.e. the edges of the image will preclude overlapping in some directions for regions adjacent the edge). In the tested embodiment of the present invention, the overlap was set to one-half the width and height of the search window.

It is noted that while rectangular search windows are envisioned to be the most practical shape, other shapes may be feasible depending on the search image being searched. For example, triangular, polygonal, circular or even elliptical search windows might be employed. For the purposes of explaining the present invention a rectangular search window will be assumed.

Once a search window has been generated, its CH is computed. This can occur as each search window is identified, or after all the windows have been generated. Regardless, a CH is calculated for each search window in the same manner that they were generated in connection with the model images. In particular, the same quantized colors & distance ranges are employed in the quantization steps of the process. Specifically, for those pixels of the search window having a color falling within one of the previously computed pixel color ranges, the pixel's color is quantized by assigning the pixel to the pixel color range into which its color falls. Then, as with the model image CHs, every possible unique, non-ordered pair of pixels in the search window is identified. Next, the distance separating the two pixels of those pixel pairs having separation distances that fall within one of the previously computed distance ranges is quantized by assigning the pixel pair to the distance range into which its separation distance falls. Finally, each pixel pair is categorized as was done with the model image CHs, and a count of the number of categorized pixel pairs having the same pixel color mix/distance category is established.

1.4 Comparing Model Images And Search Windows.

Image and model CHs, $CH_p(i,j,k)$ and $CH_m(i,j,k)$ respectively, are preferably compared by computing their intersection, i.e., $$I_{pm} = \sum_{i=1}^{n_c} \sum_{j=1}^{n_c} \sum_{k=1}^{n_d} \min[(CH_p(i, j, k), CH_m(i, j, k)] \qquad (1)$$

This intersection indicates how well the image CH accounts for the model CH. For example, if the image accounts for all the entries in the model CH, then the intersection will be equal to the sum of all the entries in the model CH, or $I_{mm}$.

Figure 5:
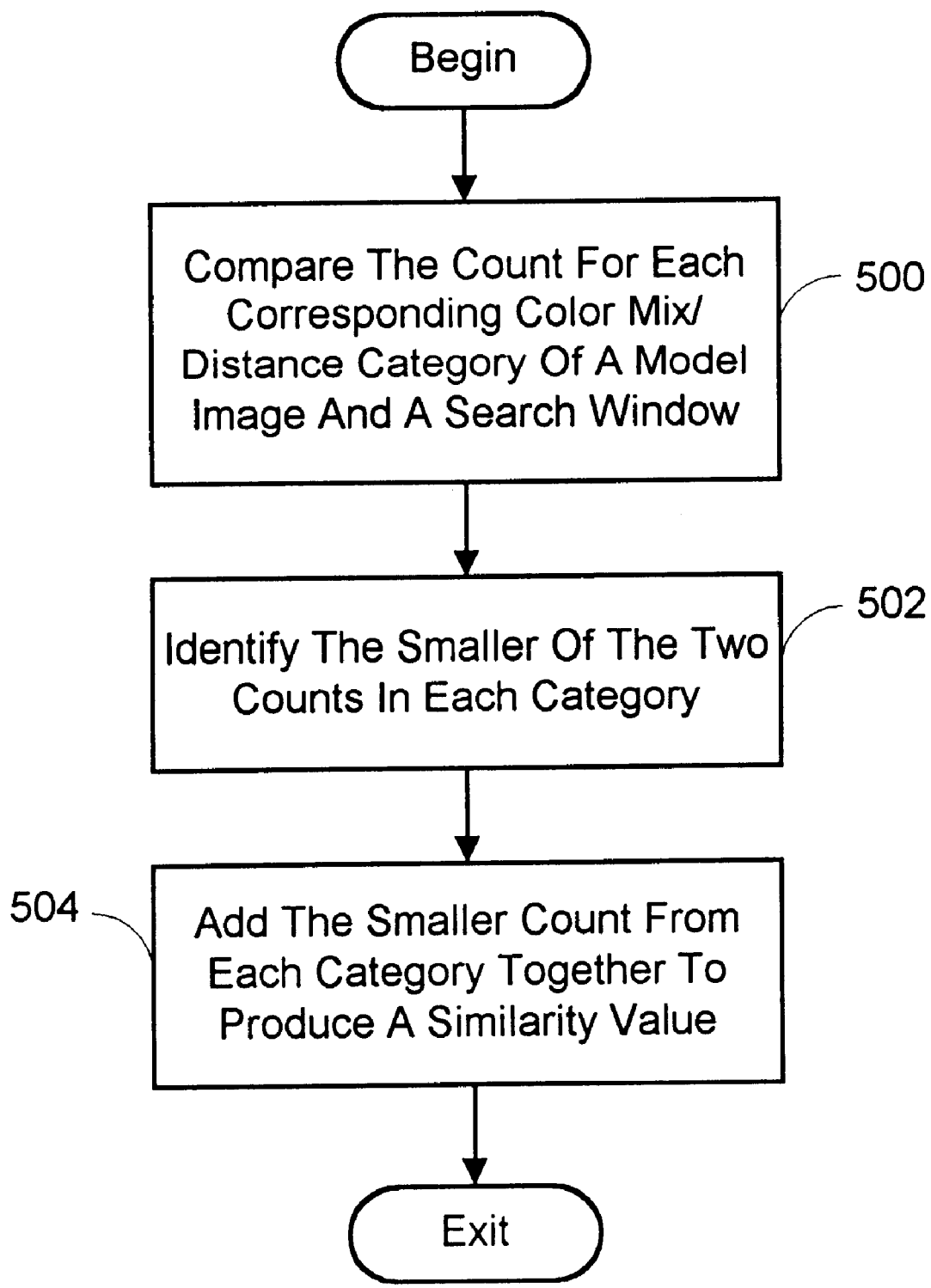
FIG. 5 is a block diagram of a process for accomplishing the co-occurrence histogram comparison module of the overall process of FIG. 3.

Specifically, as illustrated in FIG. 5, the count in each corresponding color mix/distance category is compared between a search window CH and a model image CH (step 500). The purpose is of this comparison is to identify the smaller of the two counts in each category, as indicated in step 502. The identified smaller counts from each color mix/distance category are added together to produce a similarity value (step 504). The larger this similarity value, the greater the similarity between the associated model image and search window.

It is noted that two matching images of an object will have a larger similarity value than non-matching images because the smallest count from each category will be nearly as large as the larger count, whereas the smaller count in non-matching images is likely to be significantly smaller than the larger value. Thus, the sum of the smaller counts from matching images should be larger than the sum for non-matching images.

The intersection method is an attractive measure of similarity, because if the image CH contains extra entries from the background, they will not reduce the quality of the match. However, if the image CH has large values for all its entries, say due to examining a large region in the image, it could accidentally account for the entries in the model CH, causing a false alarm. As indicated earlier, the effect of the search window size, as well as other parameters, is examined based on the false alarm probability in the next section.

1.5 Finding a Match Between A Model Image And A Search Window.

An object is potentially considered to be contained in a particular portion of the search image associated with a search window if the previously described comparison between a model image and the search window yields a similarity value that exceeds a search threshold T. For instance, if it is desired that the image account for at least a fraction a of the co-occurrences in the model, then $T=\alpha I_{mm}$. The exact value of $\alpha$ will vary depending on the degree of accuracy required for the application for which the present invention is being employed. However, in a tested embodiment it was determined that an $\alpha$ of 0.9 produced satisfactory results.

Once it is determined that the intersection of a model and image search window CH exceeds the prescribed search threshold, it can be handled in two ways. In a first version, any intersection that exceeds the threshold would cause the associated search window to be declared as potentially containing the object. This version would allow identifying each location of the object in a search image which depicts more than one of the objects. In a second version, the threshold would still be used, but only the greatest of the similarity values exceeding the threshold would be chosen to indicate a search window potentially contains the object. This version would be especially useful where it is known only one of the objects exists in the image. It could also be useful in that the threshold could be made lower and the object still located, for example in a noisy image.

1.6 Refining the Object Recognition Process.

The search window associated with a similarity value exceeding the prescribed search threshold (either any search window or the search window having the greatest similarity value exceeding the threshold, as the case may be) can be considered to contain the object being sought without further processing. However, depending on the application, it might be desirable to further refine the exact location of the object within the search image. This refinement can be achieved using a two-part process. This two-part process begins as described above to find one or more search windows potentially containing the object being sought.

Figure 6:
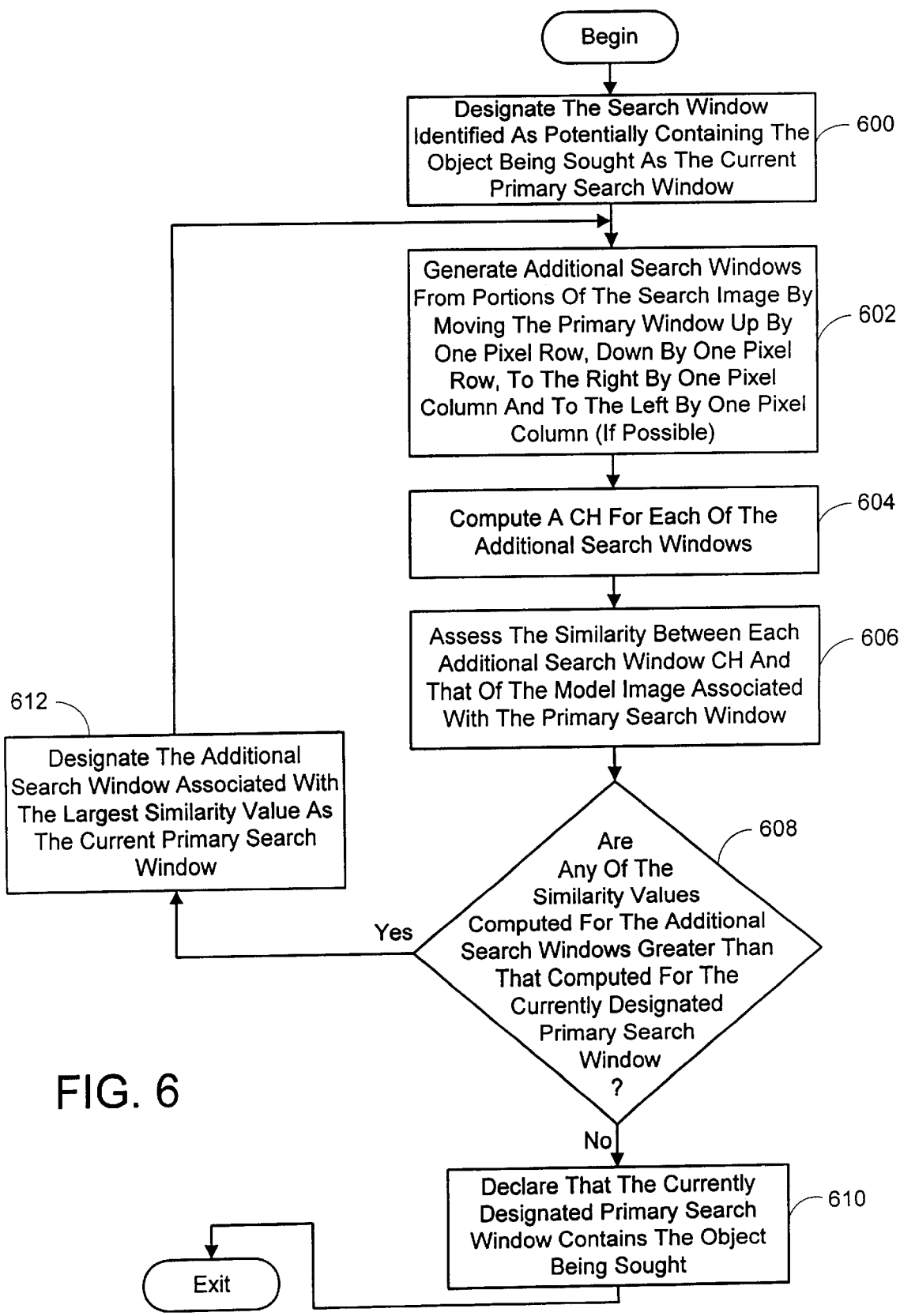
FIG. 6 is a block diagram of a process for refining the location of a search window containing the sought after object according to the present invention.

Once such a search window (or windows if looking for multiple objects in the search image) has been identified, a second, higher resolution, search is performed to find the exact location of the object in the search image. The high resolution search is essentially a pixel-by-pixel hill-climbing search. Referring to FIG. 6, the high resolution search is accomplished in connection with each of the identified search windows by first designating the identified search window as the primary search window (step 600). Then, in step 602, additional search windows are generated from portions of the search image respectively defined by moving the primary search window up by one pixel row, down by one pixel row, to the left by one pixel column, and to the right by one pixel column. This produces a total of five search windows in most cases, i.e. the primary and four translated windows. Of course, if the primary search window is located at the edge of the search image, it will not be possible to generate all four of the translated search windows and the refinement process would be conducted with fewer search windows (i.e., three or four).

The refinement process continues with the computation of a color CH for each of the additional search windows (step 604) and assessing the similarity between the CHs of each of the additional search windows and the CH of the model image associated with the original search window (step 606). These steps are performed in the same manner as described in connection with the process used to identify the original search window. The result of the foregoing steps is to produce a similarity value for each of the translated search windows. It is next determined if any of the similarity values associated with the translated search windows exceeds the similarity value previously computed for the primary search window, as indicated by step 608. If none of the similarity values associated with the additional search windows exceeds the similarity value of the primary search window, then in accordance with step 610, the primary search window is declared as actually containing the object being sought. If, however, one of the similarity values computed for the additional search windows does exceed that of the primary search window, then that particular additional search window is designated the current primary search window (step 612) and the process of steps 600 through 610 or 612 is repeated using the newly designated primary search window in place of the previously designated primary search window. Thus, the refinement process is repeated, unless the originally designated primary search window is associated with the maximum similarity value, and continues until a newly designated primary search window is associated with the maximum similarity value. This fine tunes the location of a search window containing the sought after object. Either way, a currently designated primary search window having the maximum similarity value in comparison to the additional search windows is declared to contain the object being sought (see step 610).

1.7 Differences In Scale.

There is a concern that scale or zoom differences between the model images and the search windows could skew the results of the object recognition process. For example, if the scale of the model images is different from that of the search windows, the distance ranges used to categorize pixel pairs in the respective images would not be the same, even if the object was contained in the search window. However, it is noted that the distance ranges would be proportional to each other. Thus, the scale problem could be avoided by normalizing the distance ranges between the images. This can be accomplished by designating the model image size to be associated with a scale of one. Then, the relative scale of the search windows taken from the image being searched would be used as a scaling factor to equalize the distance ranges. For example, suppose the search windows taken from the image being searched have a scale twice that of the model images. The model images would be quantized for the distance ranges as described previously. However, these ranges would be doubled in size when quantizing the search windows. In this way the number of ranges stays the same. When comparing the images, the number of pixel pairs in the unaltered distance ranges associated with the model image CH are compared to the number of pixel pairs in the corresponding doubled distance ranges in the search image CH. The result of this scale compensating process is that approximately the same number of pixel pairs will be associated with the "corresponding" distance ranges in the compared model image and search window when these images match.

2.0 Using False Alarm Probability To Choose Object Recognition Process Parameters.

With enough trial-and-error experimentation, it is possible to discover reasonable values for the number of colors $n_c$, the number of distances $n_d$, and the search window size. However, this experimentation is tedious, and it gives only a vague sense of the sensitivity of the algorithm to changes in these parameters. To remedy this, a mathematical model can be created to approximate the false alarm probability and a numerical algorithm derived to approximate the mathematical model. This provides a principled way of choosing the process's adjustable parameters.

The false alarm probability is the probability that the intersection $I_{pm}$ will exceed the match threshold $\alpha I_{mm}$, when the object is not actually in the search window. Intuitively, it is expected that the false alarm rate will increase as the search window grows, because there will be more opportunities for accidentally accounting for all the entries in the model CH. Also, it is expected that the false alarm probability will decrease as the number of colors $n_c$, and the number of distances $n_d$ is increased, because these increases lead to more specific models that are less likely to be accidentally accounted for by a random background. Pulling these parameters in the opposite direction is desired for a speedy algorithm and for one that does not required too many model viewpoints of each object. The algorithm would run faster if the search window were larger, because the whole image could then be searched faster. The intersection computation would be faster with fewer colors and distances. Fewer distances would tend to generalize a model of a particular viewpoint to match those of more disparate viewpoints, and it would match better with objects that flex. The false alarm probability helps arbitrate between these desires, letting the parameters to be set for the fastest possible execution and most tolerant matching without undue risk of false alarm.

The next subsection 2.1 shows the derivation of the probability of a given CH occurring on a random background. This is then used as discussed in subsection 2.2 to compute the probability that a random background will match a model CH. And finally, in subsection 2.3 the analysis is used to choose parameters for a real object.

2.1 Probability of a Given CH.

The derivation begins by computing the probability of occurrence of a given CH on a random background region of size h×w. The image is quantized into $n_c$ colors, with color i occurring with probability $p_i$. The co-occurrence histogram looks at pairs of colors, so it is observed that the probability of seeing colors i and j at $(x_i,y_i)$ and $(x_j,y_j)$ respectively is $p_i p_j$. The CH would not distinguish the case where the two colors exchanged positions, so it is noted that the probability of colors i and j being at $(x_i,y_i)$ and $(x_j,y_j)$ respectively or $(x_j,y_j)$ and $(x_i,y_i)$ respectively is $$P_{ij} = \begin{cases} 2p_i p_j & \text{if } i \neq j \\ p_i p_j & \text{if } i = j \end{cases} \quad i,j \in \{1, 2, \ldots, n_c\}. \tag{2}$$

For lack of any reason to believe otherwise at this stage, it will be assumed that the $n_c$ colors are uniformly distributed in the image background, giving $p_i=1/n_c$. The probabilities of the unique pairs sum to one as expected:

$$\sum_{i=1}^{n_c} \sum_{j=1}^{i} p_{ij} = 1 \tag{3}$$

Computing the probability of a given CH is complex, because there is no obvious way to break the probability into a series of independent probabilities that can be multiplied together. An approximation will be made that the probability of a juxtaposition of colors in one distance interval is independent of the probability in any other distance interval. In reality there is some correlation between distances. For instance, if there are many pairs of red pixels at one separation distance, it would be expected to see many of the same color pairs at nearby separation distances.

Figure 7:
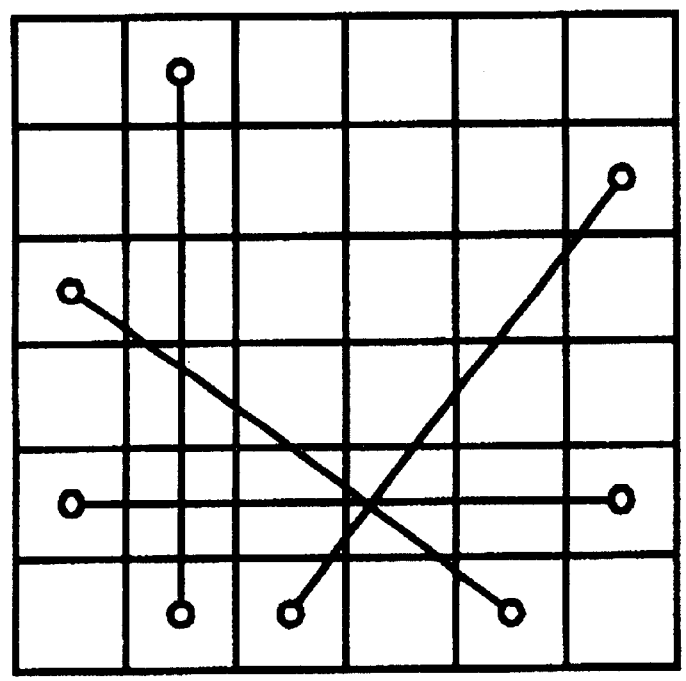
FIG. 7 is a diagram graphically depicting some of the ways that a distance of five pixels can occur in a 6×6 search window.

For a given distance interval (k−1,k), there are many different pairs of pixels separated by that amount in an h×w search window. For instance, the diagram shown in FIG. 7 depicts some of the ways that a distance of five pixels can occur in a search window of size 6×6. The variable $n_k$ defines the number of ways that a distance interval (k−1,k) can occur in the search window. This number $n_k$ is computed using a standard Matlab program.

For a fixed distance interval (k−1,k) there are $n_c(n_c+1)/2$ possible unique, nonordered color pairs with corresponding bins in the CH, each pair occurring with probability $P_{ij}$. Each bin contains $n_{ij}^k$ counts ($n_{ij}^k$=CH(i,j,k), i≤j), with $n_{ij}^k \geq 0$, $$n_k = \sum_{i=1}^{n_c} \sum_{j=1}^{i} n_{ij}^k,$$

and i,j ∈ {1,2, . . . ,$n_c$}. The probability of a partition of particular color pairs into bins with $n_{ij}^k$ in each bin is $p_{11}^{n_{11}k} p_{12}^{n_{12}k} \ldots p_{ij}^{n_{ij}k} \ldots p_{n_c,n_c}^{n_{nc,nc}k}$. This partition can happen in $$\begin{pmatrix} n_k \\ n_{11}^k, n_{12}^k, \ldots, n_{ij}^k, \ldots, n_{nc,nc}^k \end{pmatrix}$$

ways, each of which produces an identical CH. Thus, the probability of a partition of the $n_k$ color pairs into $n_c(n_c+1)/2$ bins with $n_{ij}^k$ in each bin is given by the multinomial distribution:

$$f(n_{11}^k, n_{12}^k, \ldots, n_{ij}^k, \ldots, n_{nc,nc}^k) = \quad (4)$$

$$\begin{pmatrix} n_k \\ n_{11}^k, n_{12}^k, \ldots, n_{ij}^k, \ldots, n_{nc,nc}^k \end{pmatrix} * p_{11}^{n_{11}^k} p_{12}^{n_{12}^k} \ldots p_{ij}^{n_{ij}^k} \ldots p_{ncnc}^{n_{nc,nc}^k}$$

where $$\begin{pmatrix} n_k \\ n_{11}^k, n_{12}^k, \ldots, n_{ij}^k, \ldots, n_{nc,nc}^k \end{pmatrix} = \frac{n_k!}{n_{11}^k! n_{12}^k! \ldots n_{ij}^k! \ldots n_{nc,nc}^k!}.$$

The function $f(n_{11}^k, n_{12}^k, \ldots, n_{ij}^k, \ldots, n_{n_c,n_c}^k)$ will be abbreviated as $f(n_c, n_k)$ in the following description.

The function $f(n_c, n_k)$ is the probability of observing a given set of co-occurrences in a distance range (k–1,k). The aforementioned assumption says that these probabilities are independent with respect to k, so the probability of seeing a particular CH in the search window is $$P(CH) = \prod_{k=1}^{n_d} f(n_c, n_k) \quad (5)$$

2.2 False Alarm Probability Approximation.

If the intersection of the model CH and the image region CH exceeds the threshold T without the object being there, then this is a false alarm. Ideally, to compute the probability of a false alarm, a list of all the CHs whose intersection with the model CH exceeds the threshold would be made. Equation (5) would then be used to compute the probability of each CH in the list and sum the probabilities to get the false alarm probability. However, this list is much too long.

Instead, the multinomial distribution is approximated as a multivariate Gaussian distribution and integrated. This simplifies the problem from summing values in an enormous list to integrating a multidimensional Gaussian.

From [12] it is known that Equation (4) can be approximated by the ordinate of a multidimensional Gaussian:

$$f(n_c, n_k) \approx g_k(n) = \frac{1}{(2\pi)^{m/2}|\Sigma|^{1/2}} \exp\left[-\frac{1}{2}(n-\mu)^T \Sigma^{-1}(n-\mu)\right] \quad (6)$$

where $M = n_c(n_c+1)/2 - 1$
$n = (n_{11}^k, n_{12}^k, \ldots, n_{ij}^k, \ldots, n_{n_c-1,n_c}^k)^T \quad i \leq j$
$\mu = n_k(p_{11}, p_{12}, \ldots, p_{ij}, \ldots, p_{n_c-1,n_c})^T \quad i \leq j$ It is noted that the dimensionality of these vectors is one less than the number of color pairs $n_c(n_c+1)/2$. This is because once all but the last color co-occurrence bin has been filled, the last bin must contain exactly enough counts to make the total $n_k$.

To specify the inverse covariance $\Sigma^{-1}$ the co-occurrence probabilities are renamed: $q_1 = p_{11}, q_2 = p_{12}, \ldots, q_{n_c(n_c+1)/2-1} = p_{n_c-1,n_c}$, and $q^* = p_{n_c,n_c}$. Then the inverse covariance is $$\Sigma^{-1} = \{a_{rs}\} = \begin{cases} \frac{1}{n_k}\left(\frac{1}{q_r} + \frac{1}{q^*}\right) & \text{if } r = s \\ \frac{1}{n_k q^*} & \text{if } r \neq s \end{cases} \quad (r,s) \in [1, 2, \ldots, m]$$

The Gaussian $g_k(n)$ can be integrated to give probabilities of sets of CHs occurring in the image background. The integration limits are given in terms of the number of co-occurrences of particular color pairs. The Gaussian only applies to a single specified distance range (k–1,k).

The problem of listing all the CHs that could cause a false alarm must still be addressed. These would ideally be represented in terms of integration limits for the Gaussian approximation. However, this list is too complex to characterize in this way. Thus, the definition of a false alarm is simplified from "any background CH whose intersection with the model exceeds the threshold $T = \alpha I_{mm}$" to "any background CH, each of whose entries $n_{ij}^k$ exceeds a threshold $T_{ij}^k = \alpha m_{ij}^k$." Here $m_{ij}^k = I_m(i,j,k)$ is the model CH, $n_{ij}^k = CH_p(i,j,k)$ is the search window CH, and $0 < \alpha \leq 1$ is the fraction of the histogram counts that we require to declare the model found in the image. This tends to underestimate the probability of a false alarm, but experiments show that it is still approximately correct.

Integrating the Gaussian gives the probability of false alarm for all color pairs at one distance range (k–1,k). From Equation (5), the co-occurrences at different distances are considered to be independent. Thus, the probability of a false alarm can be approximated as:

$$P(\text{false alarm}) \approx \prod_{k=1}^{n_d} \int_{\Omega_k} g_k(n) \quad (7)$$

where $\Omega_k$ is the integration region for CH distance range (k–1,k). The region $\Omega_k$ is unbounded above and bounded below as $n_{11}^k \geq \alpha m_{11}^k, n_{12}^k \geq \alpha m_{12}^k, \ldots, n_{ij}^k \geq \alpha n_{ij}^k, \ldots n_{n_c-1,n_c}^k \geq \alpha m_{n_c-1,n_c}$. The actual integration is preferably performed using a standard Monte Carlo technique.

The next subsection shows plots of the false alarm probability to demonstrate how the analysis can be used to pick some of the algorithm's operating parameters.

2.3 Using False Alarm Probability To Choose Parameters.

The present object recognition system and process requires the specification of three parameters: the number of colors $n_c$, the number of distances $n_d$, and the size of the search window h×w. This section shows how a false alarm analysis can be used to guide the choice of these parameters for a model image—namely the one shown in FIG. 8(h).

Figure 9:
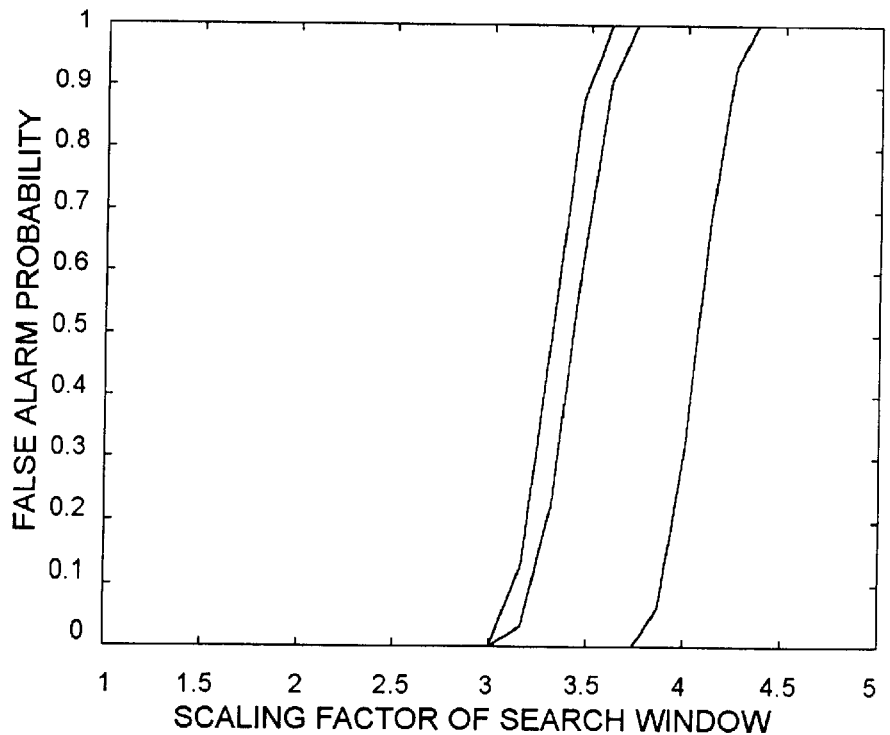
FIG. 9 is a graph plotting false alarm probability as a function of search window size. The left, middle and right curves represent the use of 6, 8 and 10 color ranges respectively. All the curves are based on 12 distance ranges.

The analysis begins by deciding the size of the search window. The graph in FIG. 9 illustrates the effect on the false alarm rate of scaling the search window size from the original size of the model image (i.e., 100×60), up to 5 times this size in each dimension, while fixing the other two parameters of interest—namely setting $n_c = 6, 8,$ and 12 respectively, and $n_d = 12$. The false alarm rate increases as expected, staying essential zero if the scaling factor is less than three. As the goal in the selection of a search window size is to use the largest window possible without risking a significant possibility of false alarms, a search window size of 300×180 (i.e., 3 times the model image size) is selected.

Figure 10:
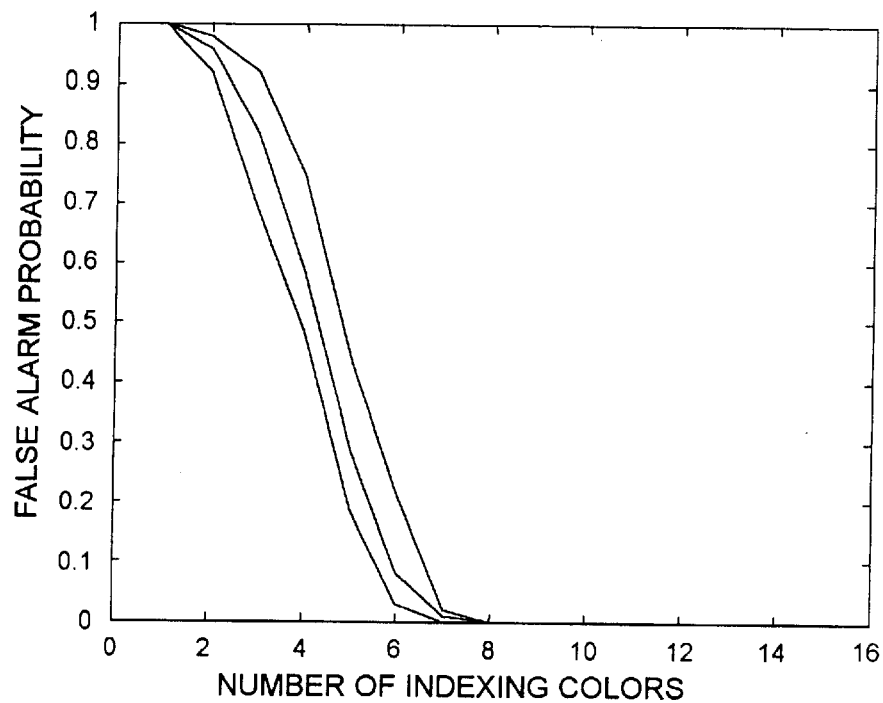
FIG. 10 is a graph plotting false alarm probability as a function of the number of color ranges. The left, middle and right curves represent the use of 14, 12 and 10 distance ranges respectively. All the curves are based on a search window scaling factor of 3.

Next, the optimal number of colors $n_c$ is chosen for the aforementioned k-means color quantization. Using a search window size of 3 times the model window (as chosen above) and $n_d$=14,12, and 10 respective distance ranges, the false alarm probability as a function of $n_c$ is shown in FIG. 10. The false alarm probability decreases with more colors, because more colors make the model more specific and less prone to matching a random background. Based on this plot, $n_c$=8 is chosen because that is where the false alarm rate first goes to nearly zero.

Finally, the optimal number of distances $n_d$ is chosen using the search window size of 3 times the model window and $n_c$=8 colors. The false alarm probability as a function of $n_d$ decreases with more distances because like more colors, more distance ranges makes the model more specific and less prone to matching a random background. In a tested embodiment, it was found that $n_d$=12 should be chosen because that is where the false alarm rate first goes to nearly zero.

It is noted that the plots of the false alarm probability, shown in FIGS. 9 and 10, illustrate how the probability varies as two of the three parameters of interest are fixed, while the third variable was varied. It is also noted that in the process of choosing the optimum search window size, $n_c$ and $n_d$ were fixed at the values later found to be nearly optimal for these parameters. The same was true for $n_d$ in the process used to select the optimal number of colors $n_c$. This was no accident. The process of selecting the optimal parameters actually required a series of iterations through the parameters and associated plots to find a mutually good-working set of values. Only the final iteration is depicted in FIGS. 9 and 10.

An alternate analysis approach can also be employed in selecting the optimal search parameters. Generally, this alternate approach involves searching through variations of all parameters simultaneously rather then fixing all but one of the parameters as described above. This simultaneous search is accomplished by exhaustively computing the false alarm rate for a substantial number of combinations of candidate search parameters or by using a standard numerical search routine to find the best combination.

The foregoing analysis approaches will result in a reasonable set of parameters to use for the first model image. Ideally a similar analysis would be performed for the model images of other viewpoints. However, it was found that using the same parameter values for all the model images produced satisfactory results. Thus, it may not be necessary to perform the analysis on all the model images if some small deviation from the optimal parameter values is acceptable. It is interesting to note that for the autocorrelograms used in [9], the authors used 64 colors and 4 distances, compared to the 8 colors and 12 distances selected in the foregoing analysis for the present system and process. It is believed that using the parameter values from [9] would likely make the present process miss many good matches due to unavoidable color shifts induced by inter-reflections with surrounding objects.

3.0 Experiments and Results.

Referring to FIGS. 8(*a*)–(*l*), a series of model images are shown of a figurine object taken as it was rotating on a motorized turntable. A long focal length lens (75 mm on a C-mount camera) was chosen so that the camera could be placed far away from the objects (about eight meters). This reduced the effects of distance-induced scale change as the objects move around in the scene. The camera's automatic gain control and automatic white balance were also disabled to help make the images consistent. The model images with captured with a black background to make segmentation easier.

As discussed previously, an important number to choose for the present system and process is the number of image models to use for a given object. For the object depicted in FIGS. 8 (*a*)–(*l*), we used 12 images to cover 360° of rotation. This choice was based on an analysis of how well the model images match themselves. We began by taking model images of the object every 5° for a total of 72 images. Adjacent images were then compared to ensure a good degree of matching existed. It was found, however, that as few as 12 model images would still provide a good degree of matching between the adjacent model images. Thus, it was decided that 12 model images were adequate for modeling the full set of viewpoints around 360° for the tested embodiment.

It is noted that while only one angle of the object's point of view was varied for testing, it would be possible to generalize to an arbitrary point of view using more model images. Thus, instead of using just 12 model images taken around an essentially horizontal viewing circle, more images taken about other non-horizontal viewing circles would also be captured. For example, to ensure the object depicted in FIGS. 8(*a*)–(*l*) could be recognized from any angle, about $12^2$=144 model images around the viewing sphere would be necessary, i.e., 12 equally spaced images around each of 12 equally spaced viewing circles.

For test images, a bright, multi-colored background was used to make clutter. It was found that inter-reflections from the colored background caused a significant color shift on the objects, which the present system and process overcame by using a rough quantization of colors (i.e.,$n_c$=8).

Some typical results are shown in FIGS. 11 and 12. FIG. 11 shows that the present system and process finds the figurine modeled with the images of FIGS. 8(*a*)–(*l*) despite significant occlusion. In FIG. 12, the system and process was able to find the aforementioned figurine standing with one arm outstretched, even though the model images (of FIGS. 8(*a*)–(*l*))show it sitting with arms at the sides. This demonstrates that the system and process can tolerate some flexing in an object.

REFERENCES

[1] D. P. Huttenlocher, G. A. Klanderman, and W. J. Ricklidge, "Comparing Images Using the Hausdorff Distance," *IEEE Transactions on Pattern Analysis and Machine Intelligence*, vol. 15, pp. 850–863, 1993.

[2] Y. Lamdan and H. J. Wolfson, "Geometric Hashing: A General and Efficient Model-Based Recognition Scheme," presented at Second International Conference on Computer Vision, Tampa, Fla., 1988.

[3] S. Sclaroff and J. Isidoro, "Active Blobs," presented at Sixth International Conference on Computer Vision, Bombay, India, 1998.

[4] M. Turk and A. Pentland, "Eigenfaces for Recognition," *Journal of Cognitive Neuroscience*, vol. 3, pp. 71–86, 1991.

[5] H. Murase and S. K. Nayar, "Visual Learning and Recognition of 3-D Objects from Appearance," *International Journal of Computer Vision*, vol. 14, pp. 5–24, 1995.

[6] M. J. Swain and D. H. Ballard, "Color Indexing," *International Journal of Computer Vision*, vol. 7, pp. 11–32, 1991.

[7] B. V. Funt and G. D. Finlayson, "Color Constant Color Indexing," *IEEE Transactions on Pattern Analysis and Machine Intelligence*, vol. 17, pp. 522–529, 1995.

[8] D. Forsyth, J. L. Mundy, A. Zisserman, C. Coelho, A. Heller, and C. Rothwell, "Invariant Descriptors for 3-D Object Recognition and Pose," *IEEE Transactions on Pattern Analysis and Machine Intelligence*, vol. 13, pp. 971–991, 1991.

[9] J. Huang, S. R. Kumar, M. Mitra, W.-J. Zhu, and R. Zabih, "Image Indexing Using Color Correlograms," presented at IEEE Conference on Computer Vision and Pattern Recognition, San Juan, Puerto Rico, 1997.

[10] G. Pass and R. Zabih, "Histogram Refinement for Content-Based Image Retrieval," presented at IEEE Workshop on Applications of Computer Vision, Sarasota, Fla., 1996.

[11] R. M. Haralick, K. Shanmugam, and I. Dinstein, "Textural Features for Image Classification," *IEEE Transactions on Systems, Man, and Cybernetics*, vol. SMC-3, pp. 610–621, 1973.

[12] O. Kempthorne and L. Folks, in *Probability, Statistics, and Data Analysis*. Ames, Iowa: Iowa State Univeristy Press, 1971, pp. 108–121.

What is claimed is:

1. A computer-implemented object recognition process for finding an object being sought in a search image, said object recognition process comprising using a computer to perform the following acts:

capturing model images of the object from a plurality of viewpoints around the object;

computing a co-occurrence histogram (CH) for each model image;

generating a plurality of search windows each comprising a portion of the search image;

computing a CH for each search window;

assessing a degree of similarity between each model image CH and each of the search window CHs; and designating a search window associated with a search window CH having a degree of similarity to one of the model image CHs which exceeds a prescribed search threshold as potentially containing the object being sought; wherein, a CH is computed by generating a count of every possible pair of pixels in an image that exhibit the same combination of a prescribed pixel characteristic and which are separated by the same distance.

2. The process of claim 1, wherein the act of capturing model images of the object comprises the act of capturing the model images from viewpoint spaced at equal angles from each other around the object.

3. The process of claim 2, wherein the act of capturing the model images from viewpoint spaced at equal angles from each other around the object, comprises the acts of:

selecting a series of candidiate separation angles for spacing said viewpoints around the object;

for each candidate separation angle, assessing a degree of similarity between at least one pair of model images having adjacent viewpoints separated by the candidate separation angle;

identifying the largest candidate separation angle associated with the model images which has an assessed degree of similarity exceeding a prescribed model image separation angle threshold; and designating the identified largest candidate separation angle as the separation angle to be employed in capturing the model images of the object.

4. The process of claim 1, wherein the act of capturing model images of the object comprises the act of capturing each model image from viewpoints located at the same distance away from the object.

5. The process of claim 1, wherein the act of capturing model images of the object comprises the act of capturing multiple model images of the object at each viewpoint around the object, and wherein each model image captured at the same viewpoint is captured at a different distance away from the object.

6. The process of claim 5, wherein the act of capturing multiple model images of the object at each viewpoint around the object at a different distance away from the object, comprises the act of capturing each of the multiple model images at the same separation distance from each other.

7. The process of claim 6, wherein the act of capturing multiple model images of the object at each viewpoint around the object at a different distance away from the object, comprises the acts of:

selecting a series of candidate separation distances for spacing said multiple model images from each other at a particular viewpoint;

for each candidate separation distance, assessing a degree of similarity between at least one pair of adjacent model images separated by the candidate separation distance, identifying the largest candidate separation distance associated with the model images which has an assessed degree of similarity exceeding a prescribed model image separation distance threshold; and designating the identified largest candidate separation distance as the separation distance to be employed in capturing the model images of the object.

8. The process of claim 1, wherein the act of computing a CH for each model image, comprises the acts of:

determining said prescribed pixel characteristic exhibited by each pixel in the model image;

dividing the overall gamut of said prescribed pixel characteristic into a series of pixel characteristic ranges;

respectively quantizing the prescribed pixel characteristic of each pixel in the model image by assigning the pixel to the pixel characteristic range into which the pixel's prescribed characteristic belongs;

identifying every possible unique, non-ordered pair of pixels in the model image;

respectively quantizing the distance separating the two pixels of each identified pixel pair of the model image by assigning the pixel pair to a one of a series of prescribed distance ranges to which its separation distance belongs, wherein said series of prescribed distance ranges is established by selecting a maximum separation distance of interest and dividing it into a number of smaller distance ranges;

categorizing each pixel pair by the assigned pixel characteristic range of each of its respective pixels and the distance range assigned to the pair, wherein the resulting categories are hereinafter referred to as pixel characteristic mix/distance categories; and establishing a count of the number of pixel pairs belonging to the same pixel characteristic mix/distance category.

9. The process of claim 8, wherein the act of dividing the overall gamut of said prescribed pixel characteristic into a series of pixel characteristic ranges, comprises the act of dividing the overall gamut into a series of equally-sized pixel characteristic ranges.

10. The process of claim 8, wherein the series of distance ranges comprises equally-sized distance ranges.

11. The process of claim 8, wherein the prescribed pixel characteristic is the pixel color.

12. The process of claim 8, wherein the model image is a depth image and the prescribed pixel characteristic is the pixel depth.

13. The process of claim 1, wherein the act of generating the plurality of search windows, comprises the acts of:
   cordoning off the entire search image into a series of regions having a prescribed size and shape; and
   designating each region as a separate search window.

14. The process of claim 13, wherein the prescribed shape of each region is rectangular, thereby forming rectangular search windows.

15. The process of claim 13, wherein each region is of equal size, thereby forming equally-sized search windows.

16. The process of claim 13, wherein each region of the search image overlaps all adjacent regions.

17. The process of claim 16, wherein each region of the search image overlaps its adjacent regions by one half of its width if the adjacent regions are beside the overlapping region, and by one-half of its height if the adjacent regions are above or below the overlapping region.

18. The process of claim 8, wherein the act of computing the CH for each search window, comprises the acts of:
   respectively quantizing the prescribed pixel characteristic of those pixels of the search window having a prescribed pixel characteristic falling within one of the pixel characteristic ranges by assigning the pixel to the pixel characteristic range into which the pixel's prescribed characteristic belongs;
   identifying every possible unique, non-ordered pair of pixels in the search window;
   respectively quantizing the distance separating the two pixels of those identified pixel pairs of the search window having separation distances that fall within one of the distance ranges by assigning the pixel pair to the distance range to which its separation distance belongs;
   categorizing each pixel pair having quantized pixel characteristics and distance by the assigned pixel characteristic range of each of its respective pixels and the distance range assigned to the pair, and
   establishing a count of the number of categorized pixel pairs having the same pixel characteristic mix/distance category.

19. The process of claim 18, wherein the act of assessing the degree of similarity between each model image CH and each of the search window CHs comprises, for each model image and search window assessed, the acts of:
   comparing the count for each pixel characteristic mix/distance category of the model image to the count for the corresponding pixel characteristic mix/distance category of the search window;
   identify the smaller of the two counts in each corresponding category; and
   add the identified smaller count from each corresponding category together to produce a similarity value.

20. The process of claim 19, wherein the act of designating a search window associated with a search window CH having a degree of similarity to one of the model image CHs which exceeds a prescribed search threshold as potentially containing the object being sought, comprises the act of designating a search window as potentially containing the object being sought if the similarity value computed for the search window CH and one of the model image CHs exceeds the prescribed search threshold.

21. The process of claim 20, wherein the act of designating a search window associated with a search window CH having a degree of similarity to one of the model image CHs which exceeds a prescribed search threshold as potentially containing the object being sought, comprises the act of designating each search window associated with a search window CH having a degree of similarity to one of the model image CHs which exceeds the prescribed search threshold, whenever it is anticipated that there will be more than one of the sought after objects in the search image.

22. The process of claim 21, further comprising the act of declaring each search window designated as potentially containing the object being sought as actually containing the object.

23. The process of claim 20, wherein the act of designating a search window associated with a search window CH having a degree of similarity to one of the model image CHs which exceeds a prescribed search threshold as potentially containing the object being sought, comprises the acts of:
   determining which of the search windows associated with a search window CH having a degree of similarity to one of the model image CHs that exceeds the prescribed search threshold has the largest computed similarity value; and
   designating only said search window determined to be associated with the largest similarity value as potentially containing the object being sought.

24. The process of claim 23, further comprising the act of declaring the sole search window designated as potentially containing the object being sought as actually containing the object.

25. The process of claim 1, further comprising, for each search window designated as potentially containing the object being sought, the acts of:
   (a) naming the search window designated as potentially containing the object being sought the current primary search window;
   (b) generating additional search windows having the same shape and size as the current primary search window from portions of the search image which are translated in comparison to the portion of the search image associated with the primary search window;
   (c) computing a CH for each of the additional search windows;
   (d) assessing the degree of similarity between each additional search window CH and the model image CH associated with the primary search window;
   (e) determining whether any of the additional search windows have a higher degree of similarity to the model image CH associated with the primary search window than the primary search window itself;
   (f) whenever none of the additional search windows has a higher degree of similarity to the model image CH associated with the primary search window than the primary search window itself, declaring the current primary search window as actually containing the object being sought;
   (g) whenever one or more of the additional search windows has a higher degree of similarity to the model image CH associated with the currently named primary search window than that primary search window itself, naming the additional search window having the highest degree of similarity to the model image CH associated with the previously named primary search window as the current primary search window in place of the previously named primary search window; and (h) repeating acts (b) through (g) for each newly named current primary search window.

26. The process of claim 25, wherein the act of generating additional search windows comprises the act of using portions of the search image translated in as many of the following directions as possible: (i) one pixel row up, (ii) one pixel row down; (iii) one pixel column to the right; and (iv) one pixel column to the left.

27. The process of claim 19, wherein the scale of the search image is different from that of the model image, and wherein the process further comprises:

performing, prior to the act of quantizing the separation distances of the pixel pairs, the act of multiplying the distance ranges computed for the model image by a factor representing the ratio of the search image scale to the model image scale; and wherein the act of comparing the count for each pixel characteristic mix/distance category of the model image to the count for the corresponding pixel characteristic mix/distance category of the search window comprises comparing the count for each pixel characteristic mix/distance category of the model image to the count for the pixel characteristic mix/distance category of the search window associated with the same mix of pixel characteristic ranges but with a distance range corresponding the distance range of the model image multiplied by the factor representing the ratio of the search image scale to the model image scale.

28. An object recognition system for finding an object being sought in a search image, comprising:

a general purpose computing device;

a computer program comprising program modules executable by the computing device, wherein the computing device is directed by the program modules of the computer program to, capture model images of the object from a plurality of viewpoints around the object;

compute a co-occurrence histogram (CH) for each model image, wherein a model image CH is computed by generating counts of every pair of pixels whose pixels exhibit a prescribed pixel characteristic that fall within the same combination of a series of pixel characteristic ranges and which are separated by a distance falling within the same one of a series of distance ranges;

generating a plurality of search windows each comprising a portion of the search image;

computing a CH for each search window, wherein a search window CH is computed by generating counts of every pair of pixels whose pixels exhibit a prescribed pixel characteristic that fall within the same combination of said series of pixel characteristic ranges and which are separated by a distance falling within the same one of said series of distance ranges;

assess a degree of similarity between each model image CH and each of the search window CHs; and designate a search window associated with a search window CH having a degree of similarity to one of the model image CHs which exceeds a prescribed search threshold as containing the object being sought.

29. The system of claim 28, wherein the program module for capturing model images of the object comprises a sub-module for capturing the model images from viewpoint spaced at equal angles from each other around the object.

30. The system of claim 29, wherein the sub-module for capturing the model images from viewpoint spaced at equal angles from each other around the object, comprises sub-modules for:

selecting a series of candidate separation angles for spacing said viewpoints around the object;

for each candidate separation angle, assessing a degree of similarity between at least one pair of model images having adjacent viewpoints separated by the candidate separation angle;

identifying the largest candidate separation angle associated with the model images which has an assessed degree of similarity exceeding a prescribed model image separation angle threshold; and designating the identified largest candidate separation angle as the separation angle to be employed in capturing the model images of the object.

31. The system of claim 28, wherein the program module for capturing model images of the object comprises a sub-module for capturing each model image from viewpoints located at the same distance away from the object.

32. The system of claim 28, wherein the program module for capturing model images of the object comprises a sub-module for capturing multiple model images of the object at each viewpoint around the object, and wherein each model image captured at the same viewpoint is captured at a different distance away from the object.

33. The system of claim 32, wherein the sub-module for capturing multiple model images of the object at each viewpoint around the object at a different distance away from the object, comprises a sub-module for capturing each of the multiple model images at the same separation distance from each other.

34. The system of claim 33, wherein the sub-module for capturing multiple model images of the object at each viewpoint around the object at a different distance away from the object, comprises sub-modules for:

selecting a series of candidate separation distances for spacing said multiple model images from each other at a particular viewpoint;

for each candidate separation distance, assessing a degree of similarity between at least one pair of adjacent model images separated by the candidate separation distance;

identifying the largest candidate separation distance associated with the model images which has an assessed degree of similarity exceeding a prescribed model image separation distance threshold; and designating the identified largest candidate separation distance as the separation distance to be employed in capturing the model images of the object.

35. The system of claim 28, wherein the program module for computing a CH for each model image, comprises sub-modules for:

determining said prescribed pixel characteristic exhibited by each pixel in the model image;

dividing the overall gamut of said prescribed pixel characteristic into a series of pixel characteristic ranges;

respectively quantizing the prescribed pixel characteristic of each pixel in the model image by assigning the pixel to the pixel characteristic range into which the pixel's prescribed characteristic belongs;

identifying every possible unique, non-ordered pair of pixels in the model image;

respectively quantizing the distance separating the two pixels of each identified pixel pair of the model image by assigning the pixel pair to a one of a series of prescribed distance ranges to which its separation distance belongs, wherein said series of prescribed distance ranges is established by selecting a maximum separation distance of interest and dividing it into a number of smaller distance ranges;

categorizing each pixel pair by the assigned pixel characteristic range of each of its respective pixels and the distance range assigned to the pair, wherein the resulting categories are hereinafter referred to as pixel characteristic mix/distance categories; and establishing a count of the number of pixel pairs belonging to the same pixel characteristic mix/distance category.

36. The system of claim 35, wherein the sub-module for dividing the overall gamut of said prescribed pixel characteristic into said series of pixel characteristic ranges, comprises a sub-module for dividing the overall gamut into a series of equally-sized pixel characteristic ranges.

37. The system of claim 35, wherein the series of distance ranges comprises equally-sized distance ranges.

38. The system of claim 35, wherein the prescribed pixel characteristic is the pixel color.

39. The system of claim 28, wherein the program module for generating the plurality of search windows, comprises sub-modules for:

dividing the entire search image into a series of regions having a prescribed size and shape; and designating each region as a separate search window.

40. The system of claim 39, wherein the prescribed shape of each region is rectangular, thereby forming rectangular search windows.

41. The system of claim 39, wherein each region is of equal size, thereby forming equally-sized search windows.

42. The system of claim 39, wherein each region of the search image overlaps all adjacent regions.

43. The system of claim 35, wherein the program module for computing the CH for each search window, comprises sub-modules for:

respectively quantizing the prescribed pixel characteristic of those pixels of the search window having a prescribed pixel characteristic falling within one of the pixel characteristic ranges by assigning the pixel to the pixel characteristic range into which the pixel's prescribed characteristic belongs;

identifying every possible unique, non-ordered pair of pixels in the search window;

respectively quantizing the distance separating the two pixels of those identified pixel pairs of the search window having separation distances that fall within one of the distance ranges by assigning the pixel pair to the distance range to which its separation distance belongs;

categorizing each pixel pair having quantized pixel characteristics and distance by the assigned pixel characteristic range of each of its respective pixels and the distance range assigned to the pair; and establishing a count of the number of categorized pixel pairs having the same pixel characteristic mix/distance category.

44. The system of claim 43, wherein the sub-module for assessing the degree of similarity between each model image CH and each of the search window CHs comprises, for each model image and search window assessed, sub-modules for:

comparing the count for each pixel characteristic mix/distance category of the model image to the count for the corresponding pixel characteristic mix/distance category of the search window;

identify the smaller of the two counts in each corresponding category, and add the identified smaller count from each corresponding category together to produce a similarity value.

45. The system of claim 44, wherein the program module for designating a search window as containing the object being sought, comprises a sub-module for designating a search window as potentially containing the object being sought if the similarity value computed for the search window CH and one of the model image CHs exceeds the prescribed search threshold.

46. The system of claim 45, wherein the program module for designating a search window as containing the object being sought, further comprises a sub-module for designating each search window associated with a search window CH having a degree of similarity to one of the model image CHs which exceeds the prescribed search threshold as containing the object being sought, whenever it is anticipated that there will be more than one of the sought after objects in the search image.

47. The system of claim 45, wherein the program module for designating a search window as containing the object being sought, comprises the acts of:

determining which of the search windows associated with a search window CH having a degree of similarity to one of the model image CHs that exceeds the prescribed search threshold has the largest computed similarity value; and designating only said search window determined to be associated with the largest similarity value as containing the object being sought.

48. The system of claim 28, further comprising, for each search window designated as containing the object being sought, a program module for refining the location of the search window in the search image, said program module for refining comprising sub-modules for:

(a) naming the search window designated as containing the object being sought the current primary search window, (b) generating additional search windows having the same shape and size as the current primary search window from portions of the search image which are translated in comparison to the portion of the search image associated with the primary search window;

(c) computing a search window CH for each of the additional search windows;

(d) assessing the degree of similarity between each additional search window CH and the model image CH associated with the primary search window;

(e) determining whether any of the additional search windows have a higher degree of similarity to the model image CH associated with the primary search window than the primary search window itself;

(f) whenever none of the additional search windows has a higher degree of similarity to the model image CH associated with the primary search window than the primary search window itself, declaring the current primary search window as representing the exact location n the search image of the object being sought;

(g) whenever one or more of the additional search windows has a higher degree of similarity to the model image CH associated with the currently named primary search window than that primary search window itself, naming the additional search window having the highest degree of similarity to the model image CH associated with the previously named primary search window as the current primary search window in place of the previously named primary search window; and (h) repeating acts (b) through (g) for each newly named current primary search window.

49. The system of claim 48, wherein the sub-module for generating additional search windows comprises a sub-module for using portions of the search image translated in as many of the following directions as possible: (i) one pixel row up, (ii) one pixel row down; (iii) one pixel column to the right; and (iv) one pixel column to the left.

50. The system of claim 44, wherein the scale of the search image is different from that of the model image, and wherein the system further comprises a program module for:

performing, prior to the act of quantizing the separation distances of the pixel pairs, the act of multiplying the distance ranges computed for the model image by a factor representing the ratio of the search image scale to the model image scale; and wherein the act of comparing the count for each pixel characteristic mix/distance category of the model image to the count for the corresponding pixel characteristic mix/distance category of the search window comprises comparing the count for each pixel characteristic mix/distance category of the model image to the count for the pixel characteristic mix/distance category of the search window associated with the same mix of pixel characteristic ranges but with a distance range corresponding the distance range of the model image multiplied by the factor representing the ratio of the search image scale to the model image scale.

51. A computer readable storage medium for storing an executable computer program in a general purpose computer to perform an object recognition procedure for finding an object being sought in a search image, comprising:

a computer program comprising program modules stored in a storage medium, wherein the computer is directed by the program modules to, capture model images of the object from a plurality of viewpoints around the object;

compute a co-occurrence histogram (CH) for each model image;

generate a plurality of search windows each comprising a portion of the search image;

compute a CH for each search window;

assess a degree of similarity between each model image CH and each of the search window CHs; and designate a search window associated with a search window CH having a degree of similarity to one of the model image CHs which exceeds a prescribed search threshold as containing the object being sought; and wherein, a CH is computed by generating a count of every possible pair of pixels in an image that exhibit the same combination of a prescribed pixel characteristic and which are separated by the same distance.

52. The computer-readable storage medium of claim 51, wherein the program module for capturing model images of the object comprises a sub-module for capturing the model images from viewpoint spaced at equal angles from each other around the object.

53. The computer-readable storage medium of claim 52, wherein the sub-module for capturing the model images from viewpoint spaced at equal angles from each other around the object, comprises sub-modules for:

selecting a series of candidate separation angles for spacing said viewpoints around the object;

for each candidate separation angle, assessing a degree of similarity between at least one pair of model images having adjacent viewpoints separated by the candidate separation angle;

identifying the largest candidate separation angle associated with the model images which has an assessed degree of similarity exceeding a prescribed model image separation angle threshold; and designating the identified largest candidate separation angle as the separation angle to be employed in capturing the model images of the object.

54. The computer-readable storage medium of claim 51, wherein the program module for capturing model images of the object comprises a sub-module for capturing each model image from viewpoints located at the same distance away from the object.

55. The computer-readable storage medium of claim 51, wherein the program module for capturing model images of the object comprises a sub-module for capturing multiple model images of the object at each viewpoint around the object, and wherein each model image captured at the same viewpoint is captured at a different distance away from the object.

56. The computer-readable storage medium of claim 55, wherein the sub-module for capturing multiple model images of the object at each viewpoint around the object at a different distance away from the object, comprises a sub-module for capturing each of the multiple model images at the same separation distance from each other.

57. The computer-readable storage medium of claim 56, wherein the sub-module for capturing multiple model images of the object at each viewpoint around the object at a different distance away from the object, comprises sub-modules for:

selecting a series of candidate separation distances for spacing said multiple model images from each other at a particular viewpoint;

for each candidate separation distance, assessing a degree of similarity between at least one pair of adjacent model images separated by the candidate separation distance;

identifying the largest candidate separation distance associated with the model images which has an assessed degree of similarity exceeding a prescribed model image separation distance threshold; and designating the identified largest candidate separation distance as the separation distance to be employed in capturing the model images of the object.

58. The computer-readable storage medium of claim 51, wherein the program module for computing a CH for each model image, comprises sub-modules for:

determining said prescribed pixel characteristic exhibited by each pixel in the model image;

dividing the overall gamut of said prescribed pixel characteristic into a series of pixel characteristic ranges;

respectively quantizing the prescribed pixel characteristic of each pixel in the model image by assigning the pixel to the pixel characteristic range into which the pixel's prescribed characteristic belongs;

identifying every possible unique, non-ordered pair of pixels in the model image;

respectively quantizing the distance separating the two pixels of each identified pixel pair of the model image by assigning the pixel pair to a one of a series of prescribed distance ranges to which its separation distance belongs, wherein said series of prescribed distance ranges is established by selecting a maximum separation distance of interest and dividing it into a number of smaller distance ranges;

categorizing each pixel pair by the assigned pixel characteristic range of each of its respective pixels and the distance range assigned to the pair, wherein the resulting categories are hereinafter referred to as pixel characteristic mix/distance categories; and establishing a count of the number of pixel pairs belonging to the same pixel characteristic mix/distance category.

59. The computer-readable storage medium of claim 58, wherein the sub-module for dividing the overall gamut of said prescribed pixel characteristic into a series of pixel characteristic ranges, comprises a sub-module for dividing the overall gamut into a series of equally-sized pixel characteristic ranges.

60. The computer-readable storage medium of claim 58, wherein the series of distance ranges comprises equally-sized distance ranges.

61. The computer-readable storage medium of claim 58, wherein the prescribed pixel characteristic is the pixel color.

62. The computer-readable storage medium of claim 51, wherein the program module for generating the plurality of search windows, comprises sub-modules for:

dividing the entire search image into a series of regions having a prescribed size and shape; and designating each region as a separate search window.

63. The computer-readable storage medium of claim 62, wherein the prescribed shape of each region is rectangular, thereby forming rectangular search windows.

64. The computer-readable storage medium of claim 62, wherein each region is of equal size, thereby forming equally-sized search windows.

65. The computer-readable storage medium of claim 62, wherein each region of the search image overlaps all adjacent regions.

66. The computer-readable storage medium of claim 58, wherein the program module for computing the CH for each search window, comprises sub-modules for:

respectively quantizing the prescribed pixel characteristic of those pixels of the search window having a prescribed pixel characteristic falling within one of the pixel characteristic ranges by assigning the pixel to the pixel characteristic range into which the pixel's prescribed characteristic belongs;

identifying every possible unique, non-ordered pair of pixels in the search window;

respectively quantizing the distance separating the two pixels of those identified pixel pairs of the search window having separation distances that fall within one of the distance ranges by assigning the pixel pair to the distance range to which its separation distance belongs;

categorizing each pixel pair having quantized pixel characteristics and distance by the assigned pixel characteristic range of each of its respective pixels and the distance range assigned to the pair; and establishing a count of the number of categorized pixel pairs having the same pixel characteristic mix/distance category.

67. The computer-readable storage medium of claim 66, wherein the sub-module for assessing the degree of similarity between each model image CH and each of the search window CHs comprises, for each model image and search window assessed, sub-modules for:

comparing the count for each pixel characteristic mix/distance category of the model image to the count for the corresponding pixel characteristic mix/distance category of the search window;

identify the smaller of the two counts in each corresponding category; and add the identified smaller count from each corresponding category together to produce a similarity value.

68. The computer-readable storage medium of claim 67, wherein the program module for designating a search window as containing the object being sought, comprises a sub-module for designating a search window as potentially containing the object being sought if the similarity value computed for the search window CH and one of the model image CHs exceeds the prescribed search threshold.

69. The computer-readable storage medium of claim 68, wherein the program module for designating a search window as containing the object being sought, further comprises a sub-module for designating each search window associated with a search window CH having a degree of similarity to one of the model image CHs which exceeds the prescribed search threshold as containing the object being sought, whenever it is anticipated that there will be more than one of the sought after objects in the search image.

70. The computer-readable storage medium of claim 68, wherein the program module for designating a search window as containing the object being sought, comprises the acts of:

determining which of the search windows associated with a search window CH having a degree of similarity to one of the model image CHs that exceeds the prescribed search threshold has the largest computed similarity value; and designating only said search window determined to be associated with the largest similarity value as containing the object being sought.

71. The computer-readable storage medium of claim 51, further comprising, for each search window designated as containing the object being sought, a program module for refining the location of the search window in the search image, said program module for refining comprising sub-modules for:

(a) naming the search window designated as containing the object being sought the current primary search window;

(b) generating additional search windows having the same shape and size as the current primary search window from portions of the search image which are translated in comparison to the portion of the search image associated with the primary search window;

(c) computing a search window CH for each of the additional search windows;

(d) assessing the degree of similarity between each additional search window CH and the model image CH associated with the primary search window;

(e) determining whether any of the additional search windows have a higher degree of similarity to the model image CH associated with the primary search window than the primary search window itself;

(f) whenever none of the additional search windows has a higher degree of similarity to the model image CH associated with the primary search window than the primary search window itself, declaring the current primary search window as representing the exact location n the search image of the object being sought;

(g) whenever one or more of the additional search windows has a higher degree of similarity to the model image CH associated with the currently named primary search window than that primary search window itself, naming the additional search window having the highest degree of similarity to the model image CH associated with the previously named primary search window as the current primary search window in place of the previously named primary search window; and (h) repeating acts (b) through (g) for each newly named current primary search window.

72. The computer-readable storage medium of claim 71, wherein the sub-module for generating additional search windows comprises a sub-module for using portions of the search image translated in as many of the following directions as possible: (i) one pixel row up, (ii) one pixel row down; (iii) one pixel column to the right; and (iv) one pixel column to the left.

73. The computer-readable storage medium of claim 67, wherein the scale of the search image is different from that of the model image, and wherein the system further comprises a program module for:

performing, prior to the act of quantizing the separation distances of the pixel pairs, the act of multiplying the distance ranges computed for the model image by a factor representing the ratio of the search image scale to the model image scale; and wherein the act of comparing the count for each pixel characteristic mix/distance category of the model image to the count for the corresponding pixel characteristic mix/distance category of the search window comprises comparing the count for each pixel characteristic mix/distance category of the model image to the count for the pixel characteristic mix/distance category of the search window associated with the same mix of pixel characteristic ranges but with a distance range corresponding the distance range of the model image multiplied by the factor representing the ratio of the search image scale to the model image scale.

* * * * *

UNITED STATES PATENT AND TRADEMARK OFFICE
CERTIFICATE OF CORRECTION

PATENT NO.    : 6,532,301 B1
DATED         : March 11, 2003
INVENTOR(S)   : Krumm et al.

It is certified that error appears in the above-identified patent and that said Letters Patent is hereby corrected as shown below:

Column 5,
Line 67, "P(CH)" should be deleted

Column 6,
Line 6, "$f(n_{c,}n_k)$" should be deleted
Line 15, "$\int \Omega_k g_k(n)$" should be deleted Column 17,
Line 32, equation should appear as follows:

$$f(n_{11}^k, n_{12}^k, \ldots, n_{ij}^k, \ldots, n_{n_c,n_c}^k)$$

Line 34, "$f(n_{c,nk})$" should be changed to -- $f(n_{c,}n_k)$ --

Column 18,
Line 10, equation should appear as follows:

$$\Sigma^{-1} = \{a_{rs}\} = \begin{cases} \dfrac{1}{n_k}\left(\dfrac{1}{q_r} + \dfrac{1}{q^*}\right) & \text{if } r = s \\ \dfrac{1}{n_k q^*} & \text{if } r \neq s \end{cases} \quad (r,s) \in [1,2,\ldots,m]$$

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,532,301 B1 | Page 1 of 1 |
| DATED | : March 11, 2003 | |
| INVENTOR(S) | : Krumm et al. | |

It is certified that error appears in the above-identified patent and that said Letters Patent is hereby corrected as shown below:

<u>Title page, Item [54] and Column 1, lines 1 and 2,</u>
Title, "OBJECT RECOGNITION WITH OCCURRENCE HISTOGRAMS" should be changed to -- OBJECT RECOGNITION WITH CO-OCCURRENCE HISTOGRAMS --

Signed and Sealed this

Fifth Day of August, 2003

JAMES E. ROGAN
*Director of the United States Patent and Trademark Office*